United States Patent [19]
Kuki et al.

[11] Patent Number: 5,850,135
[45] Date of Patent: Dec. 15, 1998

[54] CONNECTING SYSTEM AND A CONNECTION METHOD

[75] Inventors: Heiji Kuki; Sho Miyazaki; Tsutomu Tanaka; Kunihiko Watanabe; Shuichi Kanagawa; Tomohiro Keishi; Hiroshige Deguchi; Shuji Arisaka, all of Yokkaichi, Japan

[73] Assignee: Sumitomo Wiring Systems, Ltd., Japan

[21] Appl. No.: 791,109

[22] Filed: Jan. 30, 1997

[30] Foreign Application Priority Data

| Jan. 30, 1996 | [JP] | Japan | 8-014032 |
|---|---|---|---|
| Feb. 2, 1996 | [JP] | Japan | 8-017486 |
| Apr. 3, 1996 | [JP] | Japan | 8-081750 |
| Jul. 22, 1996 | [JP] | Japan | 8-192187 |

[51] Int. Cl.⁶ ................................................. H02M 10/44
[52] U.S. Cl. ............................................ 320/108; 320/109
[58] Field of Search ................................ 320/108, 109, 320/DIG. 18, DIG. 19

[56] References Cited

U.S. PATENT DOCUMENTS

| 4,347,472 | 8/1982 | Lemelson . | |
|---|---|---|---|
| 5,216,402 | 6/1993 | Carosa . | |
| 5,272,431 | 12/1993 | Nee . | |
| 5,323,099 | 6/1994 | Bruni et al. | 320/108 |
| 5,341,083 | 8/1994 | Klontz et al. . | |
| 5,349,535 | 9/1994 | Gupta | 364/483 |
| 5,412,304 | 5/1995 | Abbott | 320/108 |
| 5,461,299 | 10/1995 | Bruni . | |
| 5,498,948 | 3/1996 | Bruni et al. . | |
| 5,506,489 | 4/1996 | Abbott et al. | 320/108 |
| 5,523,666 | 6/1996 | Hoelzl et al. . | |
| 5,617,003 | 4/1997 | Odachi et al. | 320/108 |
| 5,654,621 | 8/1997 | Seelig . | |

FOREIGN PATENT DOCUMENTS

| 0 552 736 | 7/1993 | European Pat. Off. . |
|---|---|---|
| 0 552 737 | 7/1993 | European Pat. Off. . |
| 0 586 315 | 3/1994 | European Pat. Off. . |
| 0 680 057 | 11/1995 | European Pat. Off. . |

OTHER PUBLICATIONS

"Hands Free Electric Vehicle Charging System" — No. 338, Jun. 1992 — p. 517.
"Hands Free Electric Vehicle Charging System" — No. 338, Jun. 1992 — p. 482.
Patent Abstracts of Japan — vol. 7, No. 163 (M–229), 16 Jul. 1983 & JP 58 069404.

*Primary Examiner*—Peter S. Wong
*Assistant Examiner*—Gregory J. Toatley, Jr.
*Attorney, Agent, or Firm*—Anthony J. Casella; Gerald E. Hespos; Ludomir A. Budzyn

[57] ABSTRACT

To facilitate the charging of an electric automotive vehicle, a primary coil 31 connected with a charging power source is so provided as to project from a wall surface W of a parking space. An electric automotive vehicle E is advanced toward the wall surface W and parked in a position where the primary coil 31 is accommodated in a receptacle 11 provided below a front bumper B of the vehicle E. Then, a pressure switch 40 provided in a shock absorbing material 39 operates to detect the presence of the vehicle E, and the primary coil 31 is excited. A secondary coil 14 is provided above the receptacle 11. A voltage is generated in the secondary coil 14 by action of electromagnetic induction, thereby charging a battery 19.

13 Claims, 25 Drawing Sheets

FIG. 26
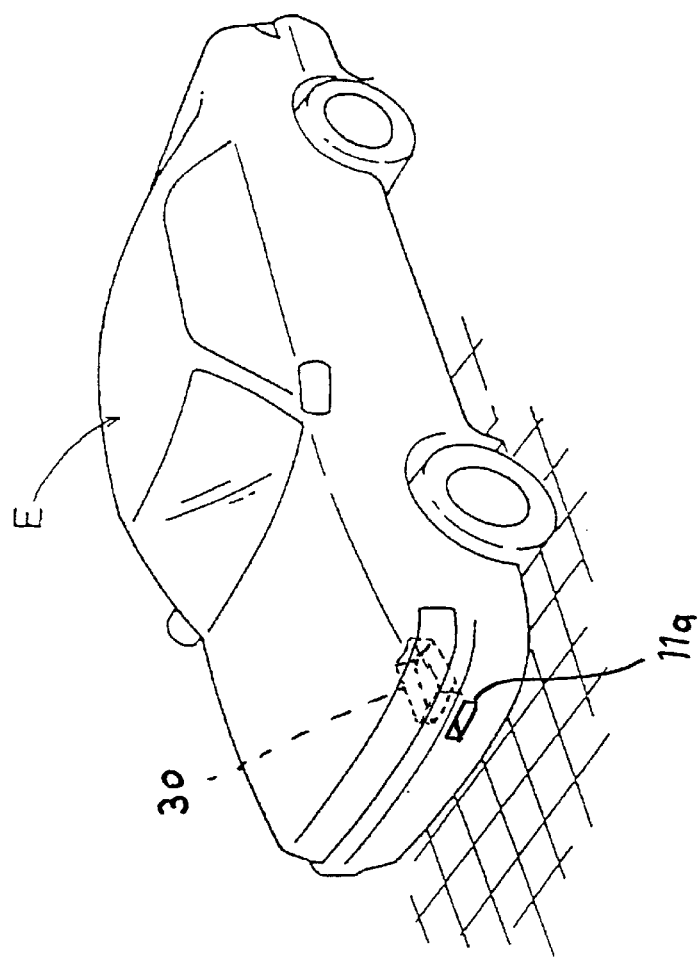
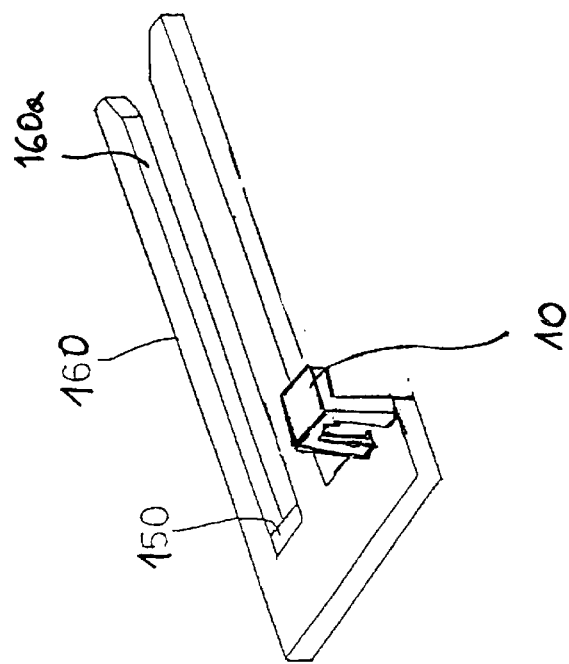

CONNECTING SYSTEM AND A CONNECTION METHOD

BACKGROUND OF THE INVENTION

1. Field of the Invention

The present invention relates to a connection system or charging system for charging an electric automotive vehicle and to a connection method.

2. Description of the Prior Art

The prior art charging system of this type which has been put into practice is constructed as shown in FIG. 27. A vehicle side connector 2 connected with a battery is provided in a body of an electric automotive vehicle 1. An external power supply connector 3 is connectable with the vehicle side connector 2. The power supply connector 3 is provided at the leading end of a cable 5 extending from an external power source unit 4 for the charging. The battery is charged by power from the external power source unit 4 via the connectors 2, 3.

There has been an idea that charging equipment may be installed in a parking space of an owner of an electric automotive vehicle at home, and that the vehicle being parked may be charged by this charging equipment.

However, with the aforementioned charging system, a driver needs to park the vehicle 1 in the parking space; get out of the vehicle 1; walk to where there is the charging equipment; take the power supply connector 3 from the charging equipment; bring the power supply connector 3 to the vehicle 1 while withdrawing the cable 5; open a connector cover 1a of the body vehicle; connect the power supply connector 3 with the vehicle side connector 2; and turn a charging switch on. The above charging operation is fairly cumbersome. Further, since the prior art charging connectors are constructed such that a power supply path is established by fittably connecting terminals, a large resistance acts while the connectors are fitted to each other. Accordingly, a relatively large force is required to connect the connectors.

Furthermore in recent years, non-contact type charging systems for electric automotive vehicles using electromagnetic induction have been developed. An example of such charging systems is the one disclosed in Japanese Unexamined Patent Publication No. 5-258962. This system is such as shown in FIG. 28 that a secondary coil unit 1' is arranged on a body of an electric automotive vehicle, a primary coil unit 6' connected with a charging power source 5' is set in the secondary coil unit 1' to attain an electromagnetically connected state, and an alternating current is caused to flow in the primary coil unit 6' to generate a power in the secondary coil unit 1'.

Since a considerable amount of power is supplied for a long time to charge an electric automotive vehicle, it is necessary to reduce generation of heat and power loss by improving a power transmitting efficiency between the primary and secondary coil units. Further, in order to make the vehicle lightweight, there is a strong demand for making the secondary coil unit as small and lightweight as possible.

However, the secondary coil unit 1' of the prior art is constructed by a pair of container-shaped cores 2' each having an open surface and fitted with a secondary coil 3'. The cores 2' are opposed to each other such that a gap for the insertion of the primary coil unit 6' is defined between the open surfaces of the cores 2'.

Since two each of the cores 2' and the secondary coils 3' are essential for the construction of the secondary coil unit 1', the secondary coil unit 1' disadvantageously becomes large and heavy. Further, since the primary coil unit 6' is inserted between the identical assemblies of the secondary coil unit 1', it is necessary to simultaneously and properly control gaps between the primary coil unit 6' and the two identical assemblies in order to improve the power transmitting efficiency. Such a gap control is very difficult because it is likely to bring about a situation where the optimization of one gap leads to an improper control of the other gap, and accordingly the power transmitting efficiency cannot be improved.

In view of the above problems, an object of the present invention is to provide a connection system and a connection method, which are capable of easily charging an electric automotive vehicle and are suited to charging an electric automotive vehicle at home.

SUMMARY OF THE INVENTION

According to the invention, there is provided a connection system for charging a battery or drive battery of an electric automotive vehicle used to drive the vehicle, comprising a primary coil unit connected or connectable with an external power source and a secondary coil unit connected or connectable with a battery or a load, preferably provided in a vehicle, wherein the primary coil unit can be electromagnetically coupled or connected with the secondary coil unit for inducing a current in the secondary coil unit.

The primary coil unit may be displaceable, preferably in substantially upward and downward directions, so as to conform to the position, preferably a height from the ground of a parking space, of the secondary coil unit.

The primary coil unit, preferably connected with a charging power source, may be so provided as to substantially project from a wall surface, in particular arranged at an angle different from 0° or 180°, preferably substantially normal to a parking space, wherein the primary coil is insertable into a receptacle provided in proximity of the secondary coil unit, preferably in a substantially lateral or front or rear surface or surface of the vehicle, in particular as the vehicle approaches the wall surface of the parking space.

The primary coil unit may comprise a primary coil accommodated in a protection casing and a support base, and the leading end of the protection casing may be displaceable by elastically supporting the support base. For example, the support base may be elastically supported on a holder provided at the wall surface of the parking space. Alternatively the leading end of the protection casing may be displaceable by rotatably or pivotably mounting the support base on a holder via at least one support shaft. Preferably at least one elastic member is provided between the support base and the holder. The holder preferably is at a wall surface of the parking space.

Bearing holes for bearing the support shaft may be substantially larger than the support shaft and/or in the leading end of the protection casing may be displaceable by loosely fitting the support shaft in the bearing holes. Still further a slanted surface may be formed at a leading end of the primary coil unit so as to taper the primary coil unit in a coupling or insertion direction. Most preferably, a guide slanted surface is formed at a front opening edge of the receptacle into which the primary coil unit is insertable so as to make the opening area larger along a direction of insertion.

According to a further preferred embodiment, the primary and/or secondary coil units are constructed by winding a coil around a core that preferably has only one magnetically open surface, which can be opposed to the magnetically open surface of the opposite core. Thus the primary and secondary coil units are preferably set so that the open surfaces of the respective cores are arranged to be laterally slid into opposed relationship to each other.

The connection system further may comprise a biasing member, preferably provided in connection with the secondary coil unit, in particular at the vehicle, for biasing the primary coil unit and the secondary coil unit so as to attain a specified substantially opposed state.

The connection system may further comprise a guiding means, and preferably a wheel guide means, provided in connection with the primary coil unit, and preferably on the ground. The guiding means functions for guiding the secondary coil unit, in particular the vehicle, toward the electromagnetical coupling position of the primary and secondary coil units.

Still further preferably, the primary coil unit is provided in a parking space or a parking lot, a garage, a gas station or the like of the vehicle. The secondary coil unit is provided in a vehicle. There may further be provided a vehicle position detecting means for detecting that the primary and secondary coil units are in their electromagnetically connectable or coupleable positions, and a charging control circuit for exciting the primary coil unit by means of the power source on condition that the vehicle position detecting means detects that the vehicle is in a predetermined or predeterminable position.

Most preferably, a charging control circuit for controlling the exciting of the primary coil unit comprises a remaining capacity detecting means for detecting a remaining capacity of the battery, and preferably excites the primary coil unit on condition that the remaining capacity detected by the remaining capacity detecting means is equal to or smaller than a predetermined or predeterminable value.

According to still a further preferred embodiment, a display means is provided for displaying a charging or charged state corresponding to the remaining capacity of the battery. The display means may be in the parking space and/or on the vehicle.

Preferably, the connection system further comprises an identification code transmitting means provided in connection with the secondary coil unit, in particular provided in the vehicle. An identification code checking means may be provided in connection with the primary coil unit, in particular provided in the parking space. The identification code checking means compares an identification code received from the identification code transmitting means with a pre-stored identification code. A charging control circuit then may excite the primary coil unit on condition that the identification codes compared by the identification code checking means agree.

The secondary coil unit may further comprise a receptacle for substantially receiving the primary coil unit and the primary coil unit may comprise a handle for the insertion of the primary coil unit into the receptacle, preferably by hand.

According to the invention, there is further provided a connection method for charging a battery or drive battery of an electric automotive vehicle used to drive the vehicle, in particular using a connecting system according to one or more of the preceding embodiments. The method comprises the steps of: electromagnetically coupling a primary coil unit that is connected or connectable with an external power source to a secondary coil unit that is connected or connectable to a battery and/or a load, and then inducing a current from the primary coil unit in the secondary coil unit.

According to a preferred embodiment of the invention, the electromagnetic coupling step comprises the step of moving the secondary coil unit, in particular by moving the vehicle, to couple the primary and secondary coils unit.

Preferably, the electromagnetic coupling step comprises the step of substantially opposing magnetically open surfaces of the primary and secondary coil units, and/or the step of laterally sliding the primary and/or secondary coil unit toward each other.

According to still a further preferred embodiment, an electromagnetic induction apparatus is connected by parking the vehicle in a predetermined position of a parking space to supply a power from a charging power source installed in the parking space to the battery of the vehicle.

With this method, the electromagnetic induction apparatus is connected by a usual action of parking the vehicle in the predetermined position to supply a power from the charging power source installed in the parking space to the battery. Accordingly, unlike the prior art, an operation of fittably connecting the connectors can be dispensed with and the charging can very easily be performed.

The specific construction of the connection system or charging system preferably comprises:

a primary coil provided in a parking space of the vehicle and connected with a charging power source, a secondary coil provided in the vehicle and connected with a charging circuit for the battery, a vehicle position detecting means for detecting that the primary and secondary coils are in their magnetically connectable positions, and a charging control circuit for exciting the primary coil by means of the charging power source on condition that the vehicle position detecting means detects that the vehicle is in a predetermined position. With this construction, the battery can automatically be charged only by parking the vehicle in the predetermined position.

Preferably, the charging control circuit comprises a remaining capacity detecting means for detecting a remaining capacity of the battery, and excites the primary coil on condition that the remaining capacity detected by the remaining capacity detecting means is equal to or smaller than a predetermined value.

With this construction, the charging is performed when the remaining capacity of the battery is small, and not when the remaining capacity thereof is large. Accordingly, the battery can be charged in proper quantities, obviating the need for worrying about the remaining capacity.

A display means for displaying a charged state corresponding to the remaining capacity of the battery preferably is provided in the parking space. This construction is convenient because the charged state of the battery can be confirmed outside the vehicle. An identification code transmitting means may be provided in the vehicle, and the charging control circuit excites the primary coil on condition that it receives a specified identification code.

With this construction, the charging is started only when the vehicle which transmits the specified identification code is parked. Accordingly, events where the other vehicle is inadvertently charged and the vehicle intruded into the parking space is charged without permission and other undesirable events can securely be prevented.

According to still a further preferred embodiment, there is provided a connection system or an electromagnetic connection apparatus provided in a parking space for an electric automotive vehicle for charging a battery of the vehicle, comprising a primary coil unit supported on a wall surface of the parking space and including a primary coil which can be opposed to a secondary coil provided at a front part of the vehicle. The primary coil unit may be displaceable upward and downward so as to conform to the height of the secondary coil from the ground of the parking space.

Thus there is provided an electromagnetic connection apparatus used for charging an electric automotive vehicle which is capable of securely establishing an electromagnetic connection when power is supplied to the vehicle.

With this construction, it is sufficient to advance the vehicle toward the wall surface of the parking space to oppose the secondary coil of the vehicle to the primary coil at the wall surface. In other words, the charging of the vehicle can be prepared only by a usual action of parking the vehicle. In this case, since the degree of compression of the suspension spring provided in the vehicle body differs, for example, depending upon the carrying loads of the vehicle, the height of the secondary coil mounted on the vehicle body is expected to slightly vary depending upon the carrying loads. Such a change can be compensated by the vertical displacement of the primary coil, with the result that both coils are constantly opposed to each other in a satisfactory manner.

The electromagnetic connection apparatus preferably comprises a primary coil unit which includes a primary coil connected with a charging power source and is so provided as to project from a wall surface of the parking space. The primary coil unit may be insertable into a receptacle provided in the front surface of the vehicle as the vehicle approaches the wall surface of the parking space.

With this construction, it is sufficient to insert the primary coil unit at the wall surface into the receptacle of the secondary coil unit of the vehicle by advancing the vehicle toward the wall surface of the parking space. Further, since the secondary coil is arranged together with the receptacle at the front part of the vehicle, the deposition of mud or the like on the secondary coil while the vehicle is running can be prevented. This prevents an increase of an air gap during the connection of both coils, thereby suppressing a reduction in power transmitting efficiency.

In the above electromagnetic connection apparatus, the primary coil unit is preferably such that the primary coil is accommodated in a protection casing having a support base, and the leading end of the protection casing is preferably made displaceable by supporting the support base on a holder provided at the wall surface of the parking space via an elastic member.

With this arrangement, the leading end of the primary coil unit is displaced, following the position of the front opening of the receptacle of the secondary coil unit. Accordingly, even if the vehicle is parked in a position slightly displaced from the predetermined parking position, the primary coil unit compensates for this displacement so as to be inserted into the secondary coil unit.

Further, the primary coil unit is preferably such that the primary coil is accommodated in a protection casing having a support base, and the leading end of the protection casing may be made displaceable by rotatably mounting the support base on a holder provided at the wall surface of the parking space via a support shaft and by providing elastic members between the support base and inner surfaces of the holder before and after the support shaft.

With this construction as well, the leading end of the primary coil unit is displaced, following the position of the front opening of the receptacle of the secondary coil unit so that the primary coil unit can securely be inserted into the secondary coil unit. Further, since the primary coil unit is supported on the holder via the support shaft, the primary coil is more stably positioned and has a better durability as compared with the case where it is supported only via the elastic member.

Further, bearing holes for bearing the support shaft may be formed larger than the support shaft and the leading end of the protection casing may be made displaceable by loosely fitting the support shaft in the bearing holes.

With this arrangement, the primary coil unit can make not only a pivotal movement about the support shaft, but also a pivotal movement in the plane including the support shaft. Accordingly, the primary coil unit can be displaced upward, downward, to the left and to the right while being stably supported by the support shaft. As a result, both coils can more securely be connected.

Both coils further can be connected more securely by tapering the primary coil unit toward the leading end thereof and by forming a guide slanted surface at the front opening edge of the receptacle of the secondary coil unit.

According to a further preferred embodiment of the invention, a connection system or charging system for an electric automotive vehicle comprises: a secondary coil unit provided at the vehicle, a primary coil unit connected with a charging power source and electromagnetically connectable with the secondary coil unit. The primary and secondary coil units each are constructed by winding a coil around a core having only one magnetically open surface which can be opposed to the magnetically open surface of the opposite core, and are so set that the open surfaces of the respective cores are laterally slid to be opposed to each other.

Thus there is provided a connection or charging system for an electric automotive vehicle which includes a smaller and lighter secondary coil unit mountable on the vehicle and is capable of maintaining a high power transmitting efficiency between the primary and secondary coil units.

With this construction, the secondary coil unit can be, as a whole, made smaller and lighter since it is constructed by the single core and the single coil. Further, since only one magnetic gap is formed between the primary and secondary coil units, the gap can easily be controlled. By properly controlling the gap, the power transmitting efficiency can be maintained at a high level. In the case of power supply by this kind of electromagnetic induction, it is desirable to maximally enlarge the area of the cores of the coil units opposed to each other to reduce a magnetic resistance. In this respect, it is preferred that the coil units have a flat shape. Since the respective cores are substantially opposed to each other by laterally sliding the secondary coil unit according to the present invention, an insertion path for bringing the secondary coil unit to be opposed to the primary coil unit can be made smaller. This is advantageous in the construction and/or design of the electric automotive vehicle, e.g. since only a reduced frontal surface is required for the connection system.

Preferably, the primary coil unit is provided at a parking space for the vehicle, the secondary coil unit is provided at a front or rear part of the vehicle, and the open surface of the core of the secondary coil unit is laterally slid with respect to the open surface of the core of the primary coil unit to be opposed thereto by parking the vehicle in a predetermined position of the parking space.

With this construction, the coil units can be set in their specified electromagnetic connection positions, taking advantage of a usual action of driving the vehicle forward or backward to park it in a predetermined position. Accordingly, the operation for the charging can be simplified.

Further preferably, the primary coil unit comprises the core, a primary coil and a protection casing having a support base and adapted to accommodate the core and the primary coil, and the leading end of the primary coil unit is made displaceable by supporting the support base on a holder provided at a wall surface of the parking space via an elastic member.

With this construction, the leading end of the primary coil unit can be made displaceable so as to conform to the position of the secondary coil unit. Accordingly, even if the vehicle is parked in a position slightly displaced from the predetermined charging position, the primary coil unit is moved to compensate for this displacement, and reaches a position for the electromagnetic connection with the secondary coil unit.

Still further preferably, the primary coil unit comprises the core, a primary coil and a protection casing having a support base and adapted to accommodate the core and the primary coil, the support base is rotatably supported on a holder provided at a wall surface of the parking lot via a support shaft, and the leading end of the primary coil unit is made displaceable by arranging elastic members between the support base and inner surfaces of the holder before and after the support shaft.

With this construction as well, the leading end of the primary coil unit is displaced to conform to the position of the secondary coil unit, with the result that the primary coil unit is securely moved to the position for the electromagnetic connection with the secondary coil unit. Further, the primary coil unit is supported on the holder via the support shaft, the primary coil unit is more stably positioned and has a better durability as compared to the case where the primary coil unit is supported only by the elastic members.

Most preferably, the leading end of the primary coil unit is made displaceable by forming bearing holes for bearing the support shaft larger than the support shaft and loosely fitting the support shaft in the bearing holes.

With this arrangement, the primary coil unit can make not only a pivotal movement about the support shaft, but also a pivotal movement in the plane including the support shaft. Accordingly, the primary coil unit can be displaced upward, downward, to the left and to the right while being stably supported by the support shaft. As a result, both coils can more securely be connected.

According to still a further preferred embodiment, a slanted surface may be formed at the leading end of the primary coil unit so as to taper the primary coil unit toward the leading end thereof, and/or the secondary coil unit may comprise a receptacle for receiving the primary coil unit and a guide slanted surface may be formed at the front opening of the receptacle so as to make the opening area larger along a direction toward the front. With these arrangements, the coils can more securely be connected.

Preferably the charging system further comprises a biasing member provided at the vehicle for biasing the primary coil unit toward the secondary coil unit so as to attain a specified opposed state.

With this construction, since the primary coil unit is biased toward the secondary coil unit by the biasing member, the specified opposed state, e. g. the gap of specified distance can be attained between the coils, thereby establishing a stable and secure electromagnetically connected state.

Further preferably, the secondary coil unit comprises a receptacle for receiving the primary coil unit and the primary coil unit comprises a handle for the insertion of the primary coil unit into the receptacle by hand.

With this construction, the primary coil unit can be gripped by hand to be set in the position for the electromagnetic connection with the secondary coil unit. Accordingly, the overall construction can be considerably simplified and inexpensively manufactured.

These and other objects, features and advantages of the present invention will become more apparent upon a reading of the following detailed description and accompanying drawings in which (same reference numerals denote same or similar elements).

BRIEF DESCRIPTION OF THE DRAWINGS

FIG. 26 is a perspective view of a eighth embodiment according to the invention.

DETAILED DESCRIPTION OF THE PREFERRED EMBODIMENTS

A first embodiment of the invention is described with reference to FIGS. 1 to 5.

Figure 1:
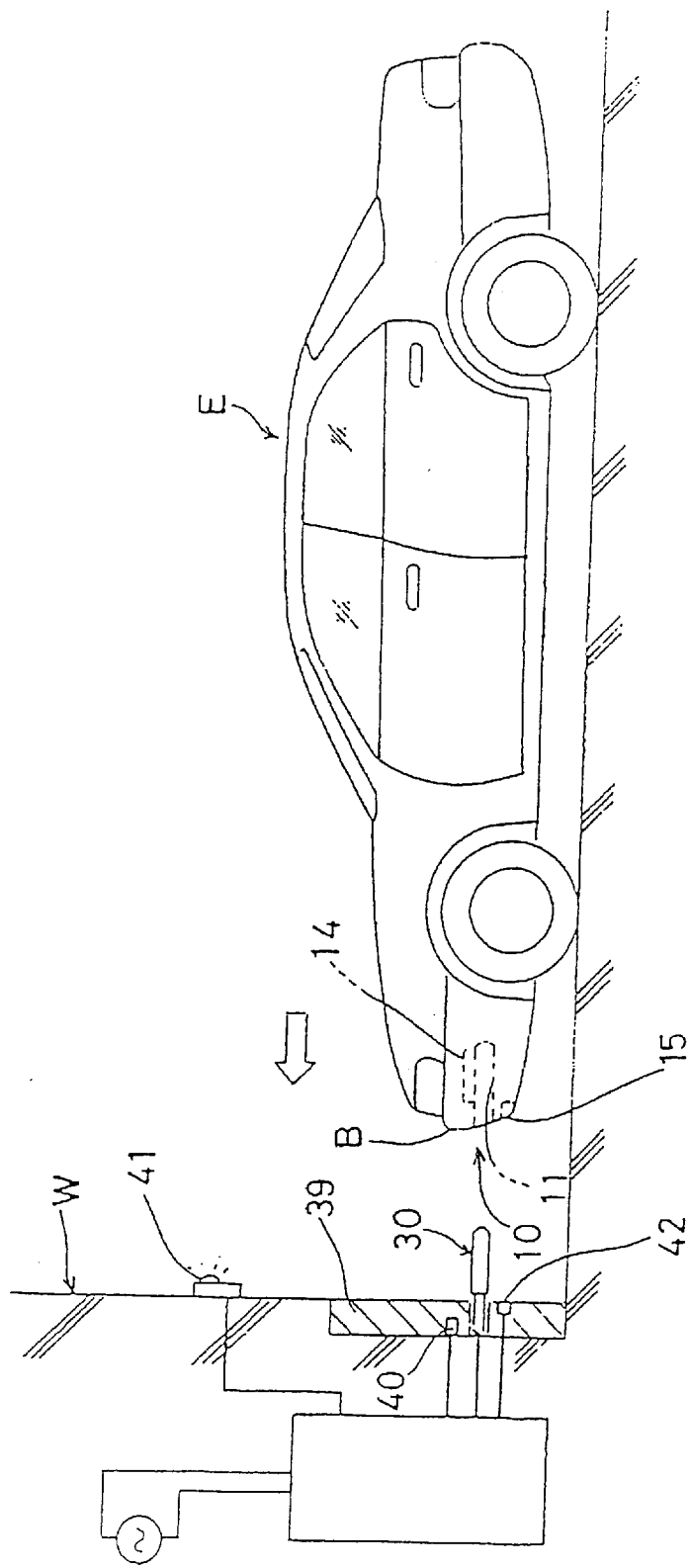
FIG. 1 is an internal construction diagram of a parking space according to a first embodiment of the invention.
Figure 2:
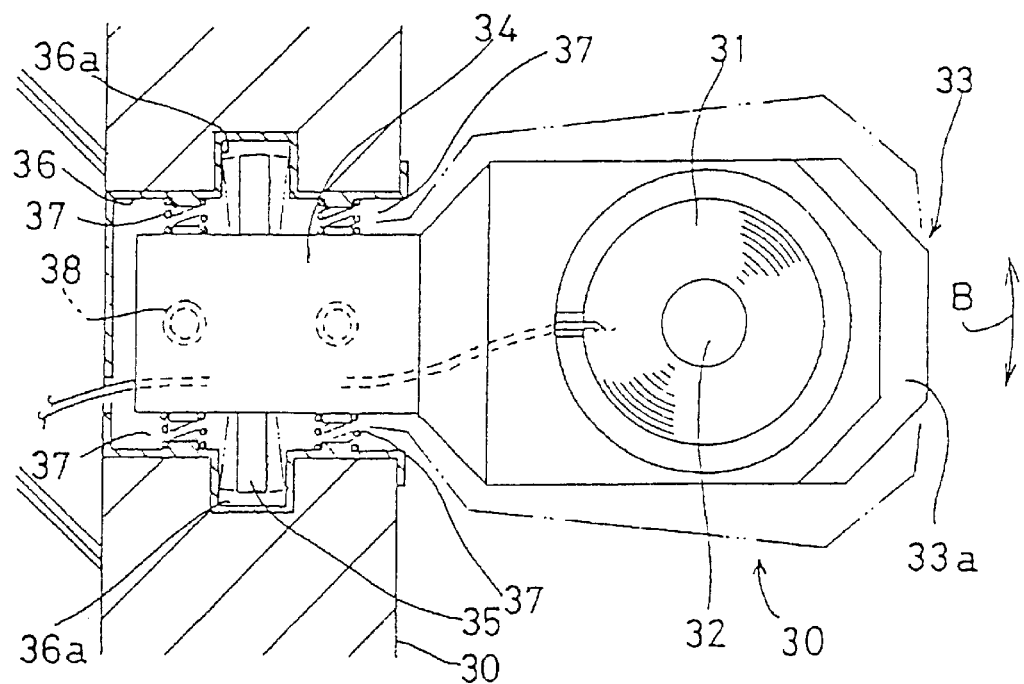
FIG. 2 is a horizontal section of a primary coil unit according to the first embodiment.
Figure 3:
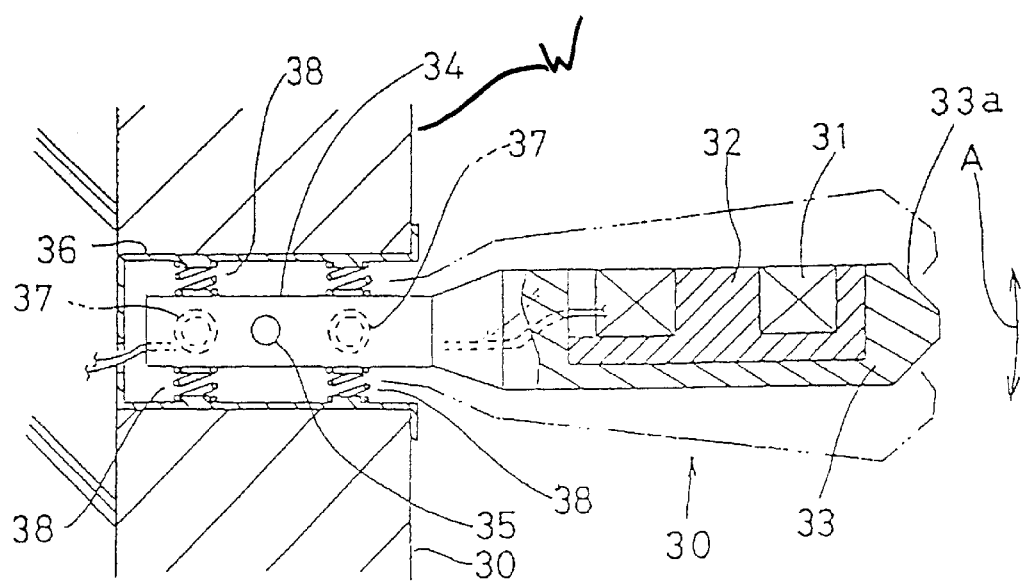
FIG. 3 is a vertical section of the primary coil unit.
Figure 4:
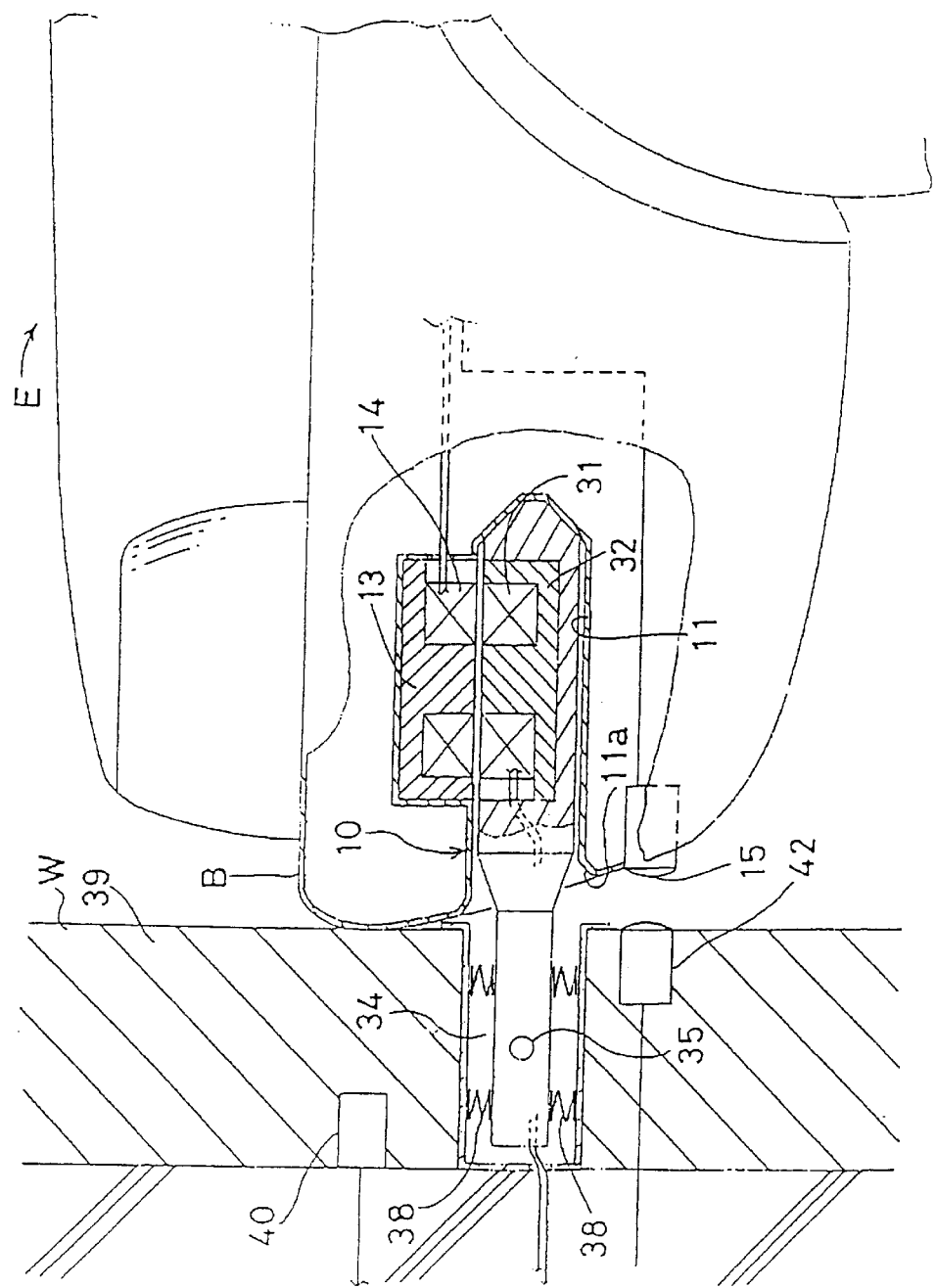
FIG. 4 is a vertical section of the primary and secondary coil units in their connection positions.

FIG. 1 shows an electric automotive vehicle E being advanced in a parking space. A primary coil unit 30 which forms part of an electromagnetic induction apparatus projects forward from a wall surface W of the parking space. As shown in FIGS. 2 and 3, the primary coil unit 30 is such that a substantially flat plate-shaped primary coil 31, formed by winding a wire around a magnetic core 32 (e.g. of ferrite), is accommodated in a protection casing 33 of, e.g. synthetic resin. A support base 34 is integrally or unitarily provided at one end of the protection casing 33. A pair of support shafts 35 project from the support base 34 along a lateral direction. The leading end of the protection casing 33 is tapered, forming an arch-shaped surface 33a.

On the other hand, a holder 36 is embedded in the wall surface W of the parking space, and the support base 34 of the protection casing 33 is inserted into the holder 36. Bearing holes 36a for bearing the support shafts 35 are formed in the inner walls of the holder 36 so that the protection casing 33 is pivotally supported along the vertical direction (directions of arrows A of FIG. 3) about the support shafts 35. Since the bearing holes 36a are sufficiently larger than the support shafts 35 so as to support the support shafts 35 with a relatively large play, the leading end of the protection casing 33 makes a pivotal movement along the substantially horizontal direction, i.e. along directions of arrows B of FIG. 2.

As shown in FIG. 2, four compression springs 37 define elastic members that are arranged before and after the support shafts 35 between the opposite side walls of the support base 34 and the opposite inner walls of the holder 36. Accordingly, the protection casing 33 is elastically supported along the horizontal direction and projects at an angle different from 0° or 180° from the wall surface W. In particular, the protection casing 33 projects in a direction substantially normal to the wall surface W as indicated by solid line in FIG. 2, to define a standby or rest position. When a force acts sideways on the leading end of the protection casing 33 in the solid line state of FIG. 2, the protection casing 33, or the primary coil unit 30 makes a reciprocal pivoting movement substantially along the horizontal direction. Further, as shown in FIG. 3, a total of four compression springs 38 are provided before and after the support shafts 35 between the upper and lower surfaces of the support base 34 and the upper and lower inner side walls of the holder 36. Accordingly, the protection casing 33 is elastically supported along the vertical direction and normally projects in the direction normal to the wall surface W as shown in FIG. 3. When a vertically acting force is exerted on the leading end of the protection casing 33 in a solid line state of FIG. 3, the protection casing 33, or the primary coil unit 30 pivots upwardly or downwardly.

On the other hand, a secondary coil unit 10 is provided at a vehicle E, preferably at a front bottom part of the vehicle E. The secondary coil unit 10 is such that a substantially flat plate-shaped secondary coil 14 formed by winding a wire around a magnetic core 13 of, e.g. ferrite is arranged at the upper surface of a receptacle 11 for substantially receiving the primary coil unit 30. When the protection casing 33 of the primary coil 31 is substantially completely received in the receptacle 11, the primary and secondary coils 31, 14 constructing the electromagnetic induction apparatus are brought into an electromagnetically connected state, where preferably the magnetic cores 13, 32 of the coils 31, 14 are substantially coaxially located. The receptacle 11 is made of, e.g. synthetic resin, and has a flat box shape with an open front surface such that the protection casing 33 of the primary coil unit 30 can be accommodated therein through the opening in the front surface of the vehicle. At the opening edge of the receptacle 11 in the front surface, a guide slanted surface 11a is formed so as to make the area of the opening larger along the direction toward the front. Accordingly, the leading end of the protection casing 33 can be guided easily.

A shock absorbing material 39 is arranged around the primary coil unit 30 on the wall surface W of the parking space. An impact produced when a front bumper B of the vehicle E comes into contact is absorbed by the shock absorbing material 39. A pressure switch 40 is embedded in the shock absorbing material 39. Alternatively a proximity switch may be used. When the vehicle E moves forward to a position where the protection casing 33 of the primary coil unit 30 is completely accommodated in the receptacle 11 and the front bumper B strikes against the shock absorbing material 39, the pressure switch 40 is turned on. This pressure switch 40 or proximity switch functions as a vehicle position detecting means. A stop lamp 41 is mounted at an upper part of the wall surface W of the parking space. The stop lamp 41 is turned on when the pressure switch 40 operates. In the wall surface W of the parking space, an infrared communication device 42 is mounted below the primary coil unit 30. When the vehicle E is parked in a specified position, the infrared communication device 42 faces an infrared communication device 15 provided at a lower part of the front bumper B of the vehicle E.

Figure 5:
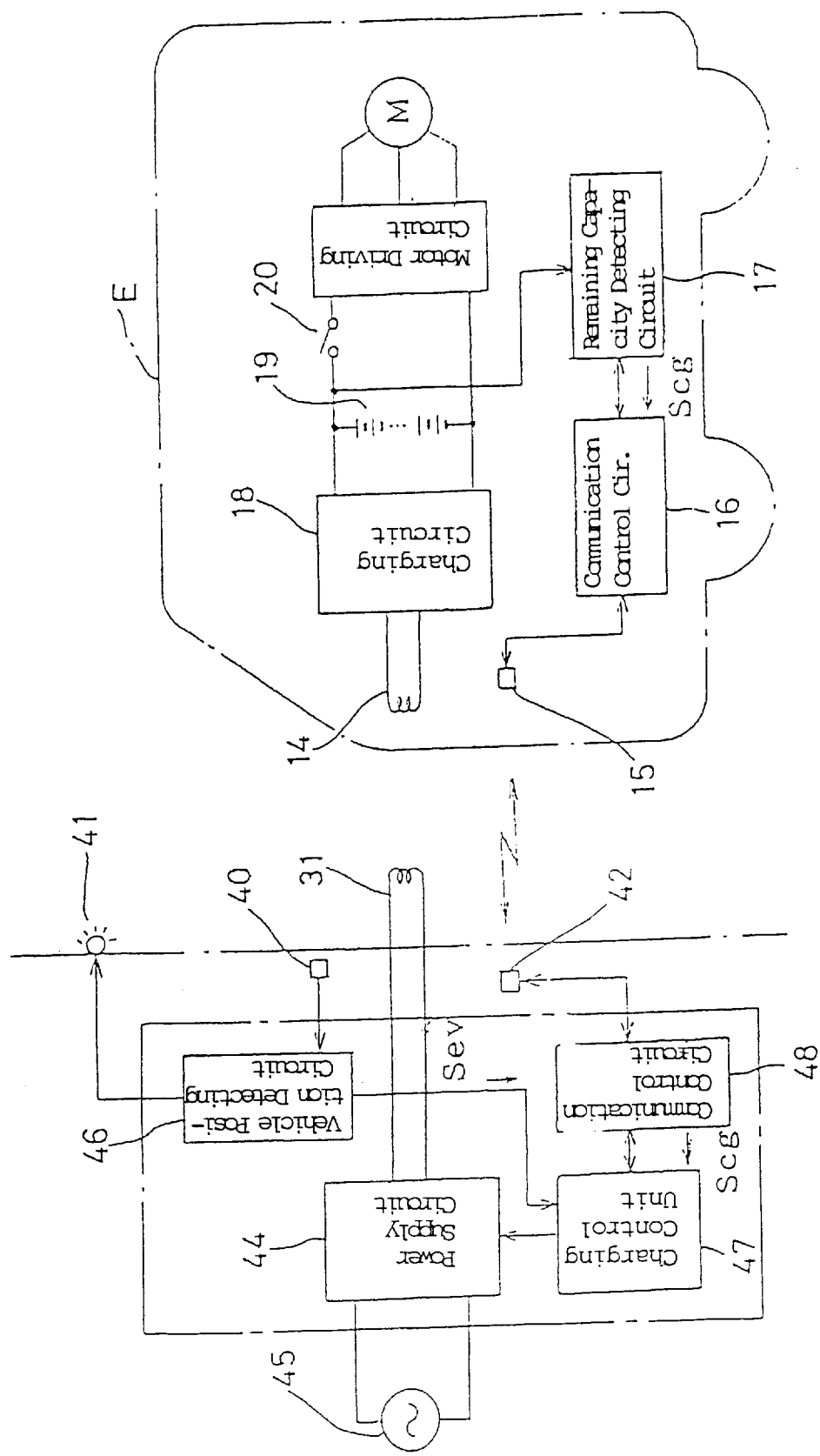
FIG. 5 is a block diagram of a charging system according to the first embodiment.

The electrical construction of the charging system is as shown in FIG. 5. A power supply circuit 44 provided in the parking space is connected with the primary coil 31. The power supply circuit 44 supplies a high frequency current of, e.g. 40 kHz to the primary coil 31 by suitably shaping, e.g. by rectifying and/or switching a commercial power source 45. A vehicle position detecting circuit 46 detects that the vehicle E has parked in the specified position upon receipt of a signal from the pressure switch 40. Based on this detection, the detecting circuit 46 turns the stop lamp 41 on and outputs a vehicle detection signal Sev to a charging control circuit 47. Upon receipt of the signal Sev from the vehicle position detecting circuit 46 and a capacity shortage signal Scg from a communication control circuit 48, the charging control circuit 47 actuates the power supply circuit 44 to excite the primary coil 31. The communication control circuit 48 is connected with the infrared communication device 42, and receives an information concerning the charging from a capacity detecting circuit via the infrared communication device 15 and a communication control circuit 16 of the vehicle E.

On the other hand, in the vehicle E, a charging circuit 18 is connected with the secondary coil 14 to charge a battery 19. The charging circuit 18 rectifies an ac current induced in the secondary coil 14 and generates a dc voltage necessary to charge the battery 19. A motor driving circuit 21 is connected with the battery 19 via a main switch 20 for driving a drive motor 22 of the vehicle E. A remaining capacity detecting circuit 17 receives an information concerning the remaining capacity of the battery 19 via an output line of the battery 19. For example, the remaining capacity detecting circuit 17 estimates the remaining capacity of the battery 19 by adding up consumed power based on the current having flowed in the output line, and outputs the capacity shortage signal Scg when the estimated remaining capacity falls short of a predetermined value. The remaining capacity detecting circuit 17 also receives, from the charging circuit 18, an information concerning a charge current flowed into the battery 19; estimates a remaining capacity increasing by the charging based on the received information; and stops outputting the capacity shortage signal Scg when the estimated remaining capacity reaches the predetermined rated value. Alternatively the remaining capacity detecting circuit 17 may directly measure the remaining capacity of the battery 19, e.g. basing upon variations of inductance or capacity of the battery 19. The remaining capacity detecting circuit 17 may also measure a temperature of the battery 19 for determining the remaining capacity, at least as a factor for such a determination.

Next, how the vehicle E is charged in this embodiment is described. The vehicle E is slowly advanced toward the wall surface W in the parking space. By bringing the front end of the vehicle E into contact with the shock absorbing material 39 on the wall surface W, the primary coil unit 30 projecting from the wall surface W is fitted into the receptacle 11 at the front part of the vehicle E. When the vehicle E comes to a position where the primary coil unit 30 is completely fitted into the receptacle 11, the front bumper B of the vehicle E presses the pressure switch 40, thereby operating the same. Accordingly, the stop lamp 41 is turned on in response to the signal from the vehicle position detecting circuit 46. If the vehicle E is stopped in this position, the primary coil 31 is coaxially located with the secondary coil 14 in the receptacle 11, being enabled to be electromagnetically connected with the secondary coil 14.

Simultaneously, the vehicle position detecting circuit 46 outputs the vehicle detection signal Sev to the charging control circuit 47. At this time, unless the remaining capacity of the battery 19 exceeds the predetermined value, the capacity shortage signal Scg is sent to the charging control circuit 47 from the remaining capacity detecting circuit 17 via the infrared communication devices 15, 42, with the result that the power supply circuit 44 operates to excite the primary coil 31. As a result, a voltage is generated in the secondary coil 14 by an electromagnetic induction phenomenon, and the charging circuit 18 charges the battery 19 of the vehicle E with the generated voltage. When the remaining capacity of the battery 19 reaches the predeterminable or predetermined rated value by the charging, the output of the capacity shortage signal Scg is stopped. Thus, the excitation of the primary coil 31 by the charging circuit 18 is stopped, completing the charging.

According to this embodiment, the primary and secondary coils 31, 14 are connected only by a usual action of parking the vehicle E in the specified position of the parking space, and power is supplied to the charging circuit 18 of the vehicle E from the commercial power source 45 in the parking space to charge the battery 19, completely obviating need for the engagement of the connectors as in the prior art. Therefore, the charging system according to this embodiment enables a remarkably easy charging and is also very suited to the use at home.

Figure 6:
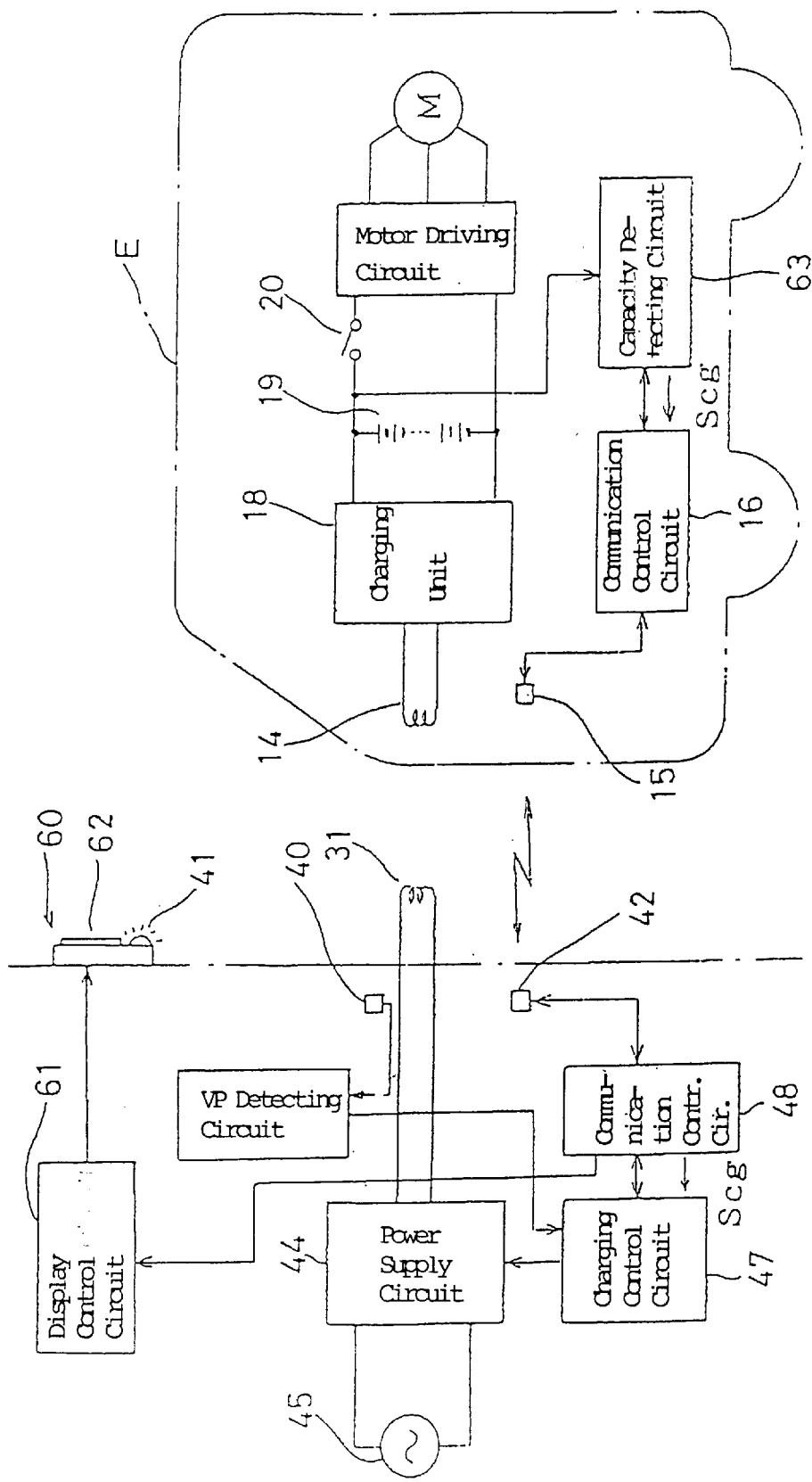
FIG. 6 is a block diagram of a second embodiment of the invention.

The second embodiment is similar to the first embodiment except that a display means for displaying a charged state corresponding to the remaining capacity of the battery 19 is additionally provided in the parking space. Accordingly, no repetitive description is given on the identical or similar construction by identifying the same elements by the same reference numerals, and only a different construction is described with reference to FIG. 6.

At an upper part of the wall surface W of the parking space, there is provided a display unit 60 which is controllably turned on by a display control circuit 61. The display unit 60 includes a stop lamp 41 and a remaining capacity indicator 62 formed e.g. by vertically arranging a plurality of LEDs.

A remaining capacity detecting circuit 63 provided in an electric automotive vehicle E constantly detects the remaining capacity of a battery 19 being charged and sends the detection data to the display control unit 61 via infrared communication devices 15, 42 to make a display corresponding to the detected remaining capacity in the capacity indicator 62. In other words, a display in proportion to the remaining capacity is made in this embodiment: all LEDS of the capacity indicator 62 are turned on when the battery 19 is fully charged, and half the number of LEDs are turned on when the battery 19 is half charged. Such a display is convenient because the remaining capacity of the battery 19 being charged is easily visible.

Figure 7:
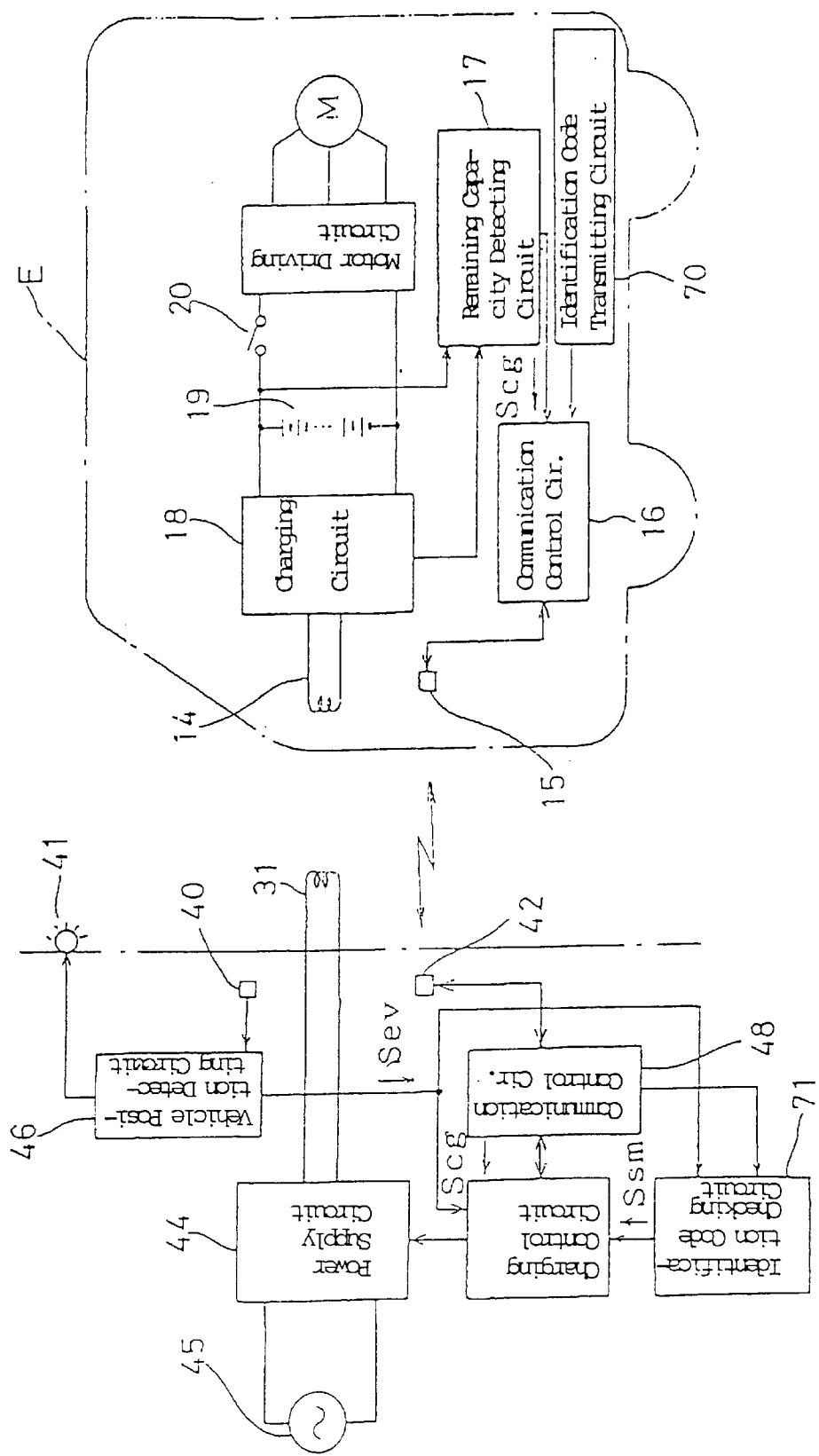
FIG. 7 is a block diagram of a third embodiment of the invention.

The third embodiment is similar to the first embodiment except that the charging is performed only when identification (ID) codes of the vehicle agree. Accordingly, no repetitive description is given on the identical or similar construction by identifying the same elements by the same reference numerals, and only a different construction is described with reference to FIG. 7.

An electric automotive vehicle E is provided with an ID code transmitting circuit 70 which is connected with a communication control circuit 16. In a parking space, there is provided an ID code checking circuit 71 which is connected with a communication control circuit 48 and a charging control circuit 47. Upon receipt of a vehicle detection signal Sev from a vehicle position detecting circuit 46, the ID checking circuit 71 sends a signal to the ID transmitting circuit 70 of the vehicle E via infrared communication devices 15, 42, causing the ID transmitting circuit 70 to respond by sending an ID code peculiar to the vehicle E via the infrared communication devices 15, 42. If the received ID code agrees with the code stored in the ID code checking circuit 71, the ID code checking circuit 71 outputs an agreement signal Ssm to the charging control circuit 47. In this embodiment, the charging control circuit 47 starts the excitation of the primary coil 31 on condition that it received the vehicle detection signal Sev, the capacity shortage signal Scg and the agreement signal Ssm.

By constructing the charging system as above, the charging is not started unless the ID code from the vehicle E agrees with the ID code stored in advance in the ID code checking circuit 71. Accordingly, a possibility that the other's car parked in the parking space is charged, or the other's car is intruded into the parking space and charged without permission can securely be prevented.

The fourth embodiment differs from the first to third embodiments in that the primary and secondary coils 31, 14 are so positioned as to establish an electromagnetic connection after the vehicle E is parked in the parking space.

Hereafter, the fourth embodiment is described with reference to FIGS. 8 to 11.

Figure 8:
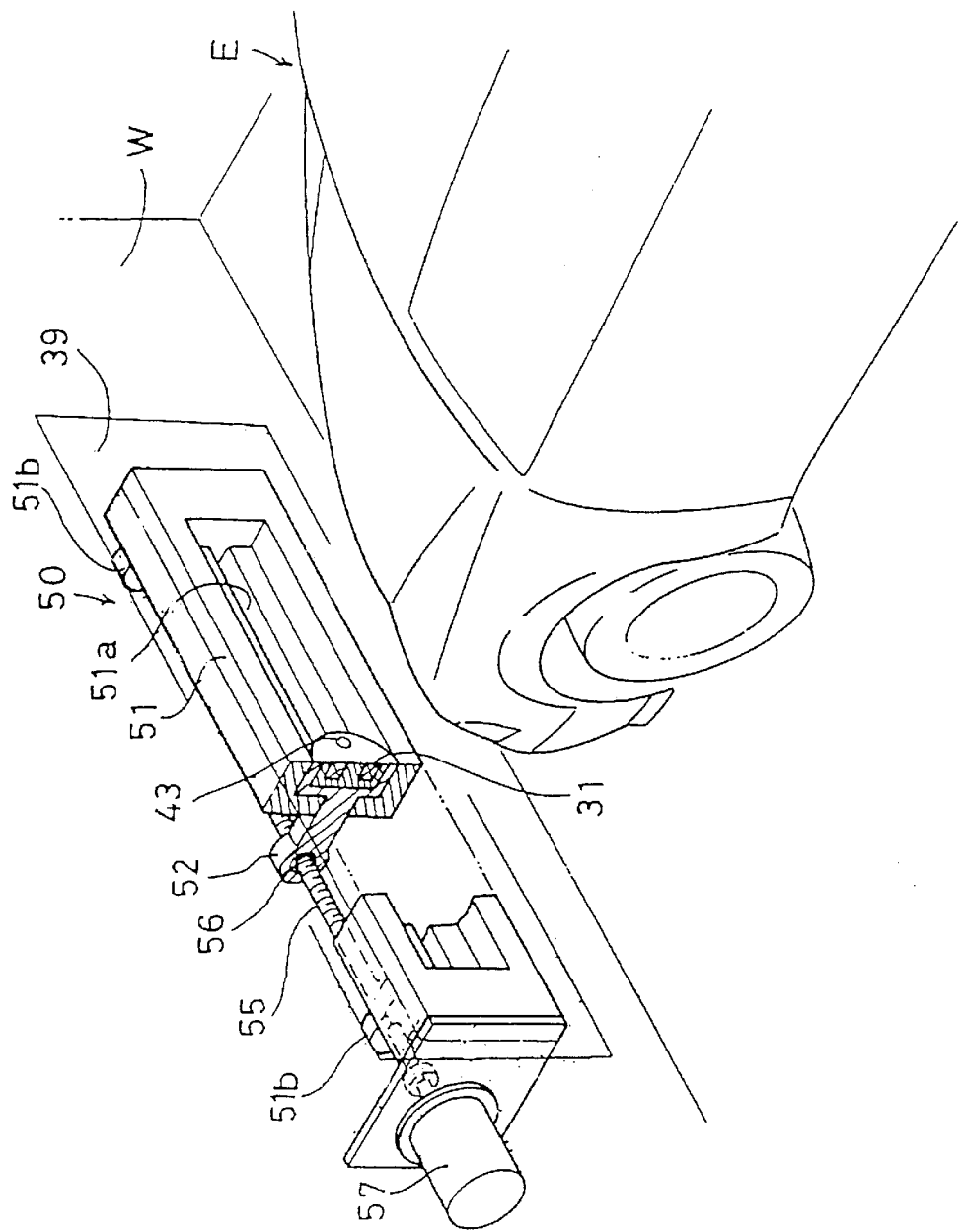
FIG. 8 is a perspective view of a parking space according to a fourth embodiment of the invention.
Figure 10:
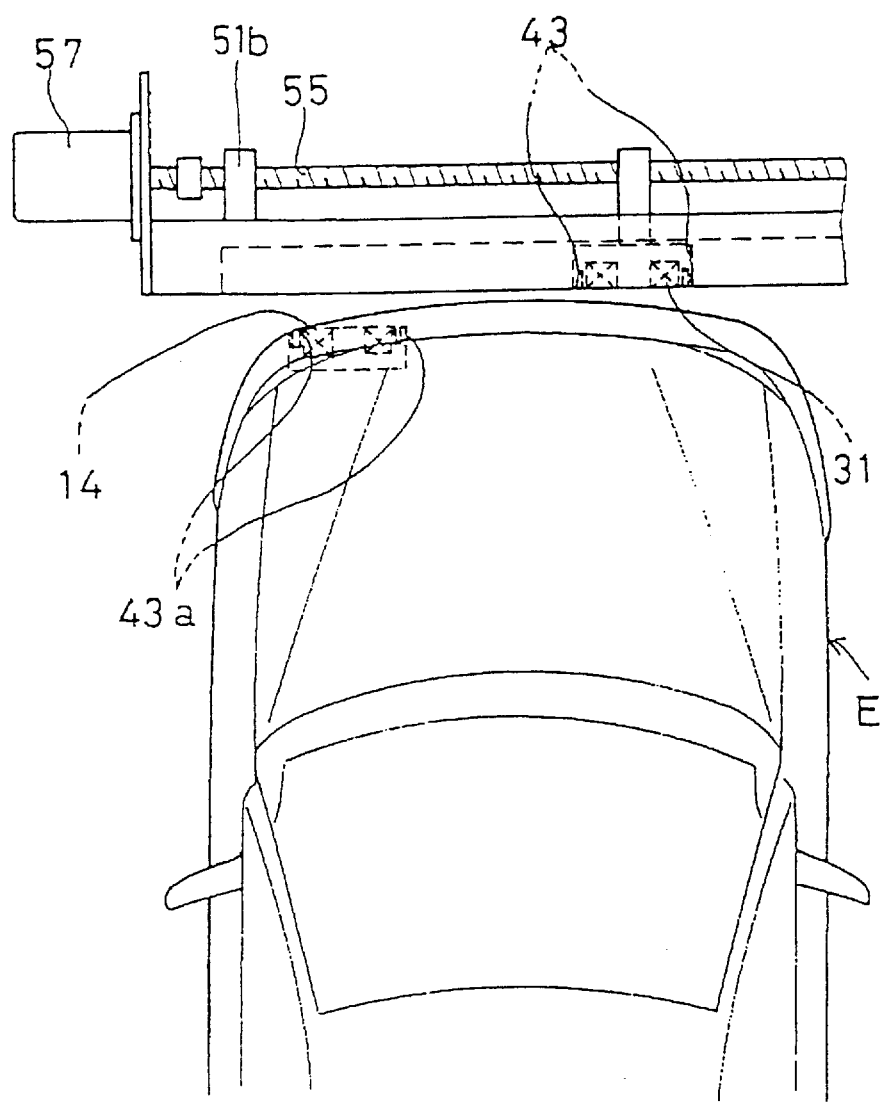
FIG. 10 is a plan view of an electric automotive vehicle parked in the parking space according to the fourth embodiment.

As shown in FIG. 8, a coil positioning apparatus 50 is provided in the wall surface W of the parking space, and a primary coil 31 is supported such that its electromagnetic connection surface faces forward. On the other hand, at the front surface of an electric automotive vehicle E, a secondary coil 14 is mounted such that its electromagnetic connection surface substantially faces in a direction toward the wall surface W, e.g. substantially forward as shown in FIG. 10.

The coil positioning apparatus 50 substantially horizontally moves the primary coil 31 by a so-called ball screw mechanism to a position where it is electromagnetically connectable with a secondary coil 14 by detecting the positional relationship of the primary and secondary coils 31, 14 by sensors 43.

The ball screw mechanism of the coil positioning apparatus 50 includes a substantially horizontally extending support rail 51, a ball screw 55 provided along the support rail 51, and a support member 52 which is movably supported on the support rail 51 and spirally fitted to the ball screw 55.

Figure 9:
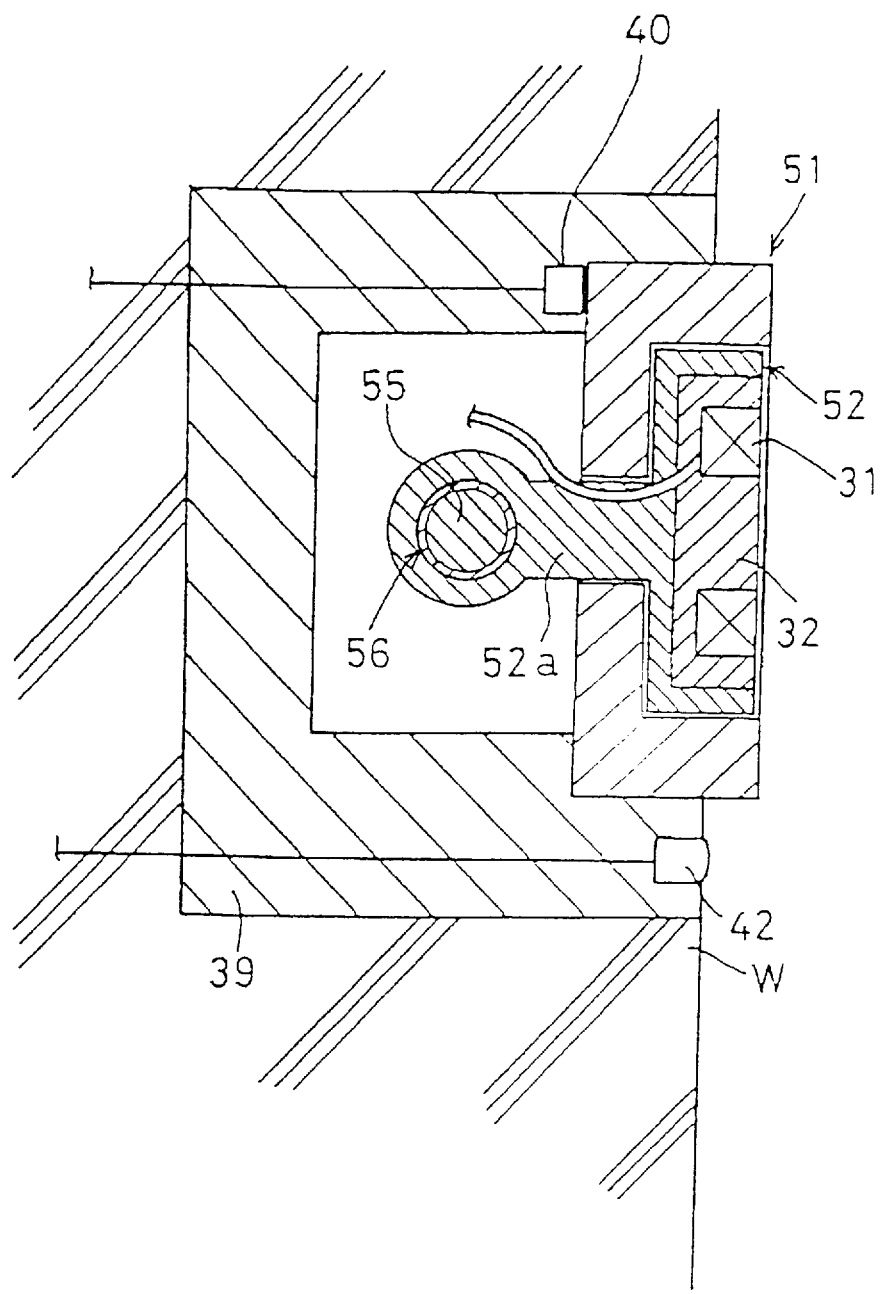
FIG. 9 is a vertical section of a primary coil unit according to the fourth embodiment.

The support rail 51 is such that a substantially horizontally extending slit 51a is formed e.g. in the middle of a plate member and the portions of the plate member above and below the slit 51a construct a pair of rails. The slit 51a is preferably formed such that the spacing between the pair of rails widens in a step-wise manner toward the front surface as shown in FIG. 9.

The support member 52 includes a substantially flat disk-shaped portion for accommodating the primary coil 31, a substantially rectangular beam 52a extending from the back of the disk-shaped portion, and a tubular internally threaded portion 56 provided at the leading end of the rectangular beam 52a so as to be spirally engageable with the ball screw 55. An integral assembly of the disk-shaped portion and the rectangular beam 52a has such a vertical cross section as to be fittable in the slit 51a of the support rail 51 in which the width is preferably widened in a step-wise manner toward the front surface. In other words, when the support member 52 is assembled into the support rail 51, it is supported on the support rail 51 with the electromagnetic connection surface of the primary coil 31 facing forward and only the internally threaded portion 56 projects backward.

The ball screw 55 is so arranged as to face the slit 51a at the back of the support rail 51, and is spirally engaged with the internally threaded portion 56 projecting backward. The opposite ends of the ball screw 55 are rotatably supported by bearings 51b projecting backward from the opposite ends of the support rail 51. To one end of the ball screw 55 is coupled a drive shaft of a motor 57 fixed to the support rail 51.

Sensors 43 are embedded in the opposite sides of the disk-shaped portion of the support member 52 with the primary coil 31 therebetween as shown in FIG. 10. The sensors 43 operate upon detecting a signal or light from signal or light emitters (43a in FIG. 10) which are provided on the opposite sides of the secondary coil 14 of the vehicle E so as to face the sensors 43. In other words, when the two sensors 43 operate upon facing the signal or light emitters 43a, the electromagnetic connection surfaces of the primary and secondary coils 31, 14 are substantially opposed to each other.

It should be noted that, when the vehicle E is stopped in the parking position, the signal or light emitters of the vehicle E emit signals or light for a predetermined time measured by, e.g. a timer.

The coils 31, 14 are positioned by the sensors 43 and the ball screw mechanism as follows. In an initial state, the support member 52 is positioned at one end of the support rail 51. When the vehicle E is stopped in the charging position, the support member 52 is moved toward the other end of the support rail 51. The motor 57 is stopped when the sensors 43 both operate while the support member 52 is moving toward the other end. Then, the coils 31, 14 are held with the electromagnetic surfaces thereof substantially opposed to each other. For example, if the vehicle E is obliquely parked, making it impossible to electromagnetically connect the coils 31, 14, the sensors 43 do not operate while the support member 52 is moving toward the other end. In such a case, the driver is notified that the electromagnetic connection is unattainable by, e.g. activating a buzzer or changing the color of a stop lamp.

In the above case, the driver may reattempt to park the vehicle E in the proper charging position.

The coil positioning apparatus 50 thus constructed is mounted on the wall surface W of the parking space via a shock absorbing material 39, and the support rail 51 slightly projects from the wall surface W. The apparatus 50 is mounted at such a height that the primary coil 31 is substantially on a level with the secondary coil 14 of the vehicle E. Further, a proximity or pressure switch 40 is embedded in the shock absorbing material 39 so as to detect that the support rail 51 is pressed by the vehicle E. In accordance with a detection signal of the pressure switch 40, a stop lamp 41 is turned on as in the first embodiment and the coil positioning apparatus 50 is activated.

Since the other construction is similar to the first embodiment, no repetitive description is given thereon by identifying the same elements by the same reference numerals.

Next, how the vehicle E is charged according to this embodiment is described. The vehicle E is slowly advanced in the parking space until a bumper B comes into contact with the support rail 51 projecting from the wall surface W. When the bumper B comes into contact with the support rail 51, the pressure switch 40 in the shock absorbing material 39 operates, thereby turning the stop lamp 41 on. The driver signalled by the stop lamp 41 stops the vehicle E (FIG. 10). At this stage, the secondary coil 14 of the vehicle E is located adjacent to a moving path of the primary coil 31 of the coil positioning apparatus 50.

Figure 11:
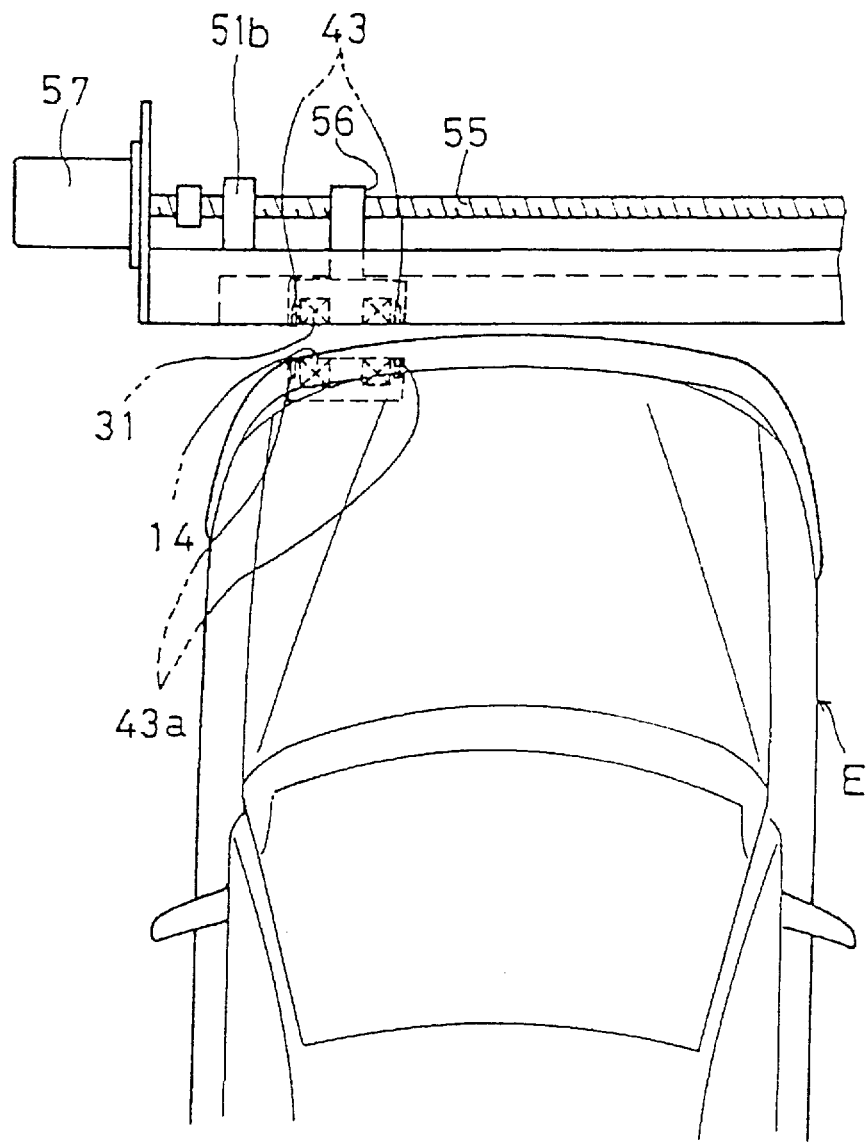
FIG. 11 is a plan view showing a state where the primary coil is driven to an electromagnetically connectable position with a secondary coil in the fourth embodiment.

Simultaneously, the coil positioning apparatus 50 starts operating in response to the operation of the pressure switch 40. In other words, the motor 57 is driven to move the primary coil 31 at the one end of the support rail 51 toward the other end. When the primary and secondary coils 31, 14 are brought into electromagnetically connectable positions, i.e. the two sensors 43 operate, the motor 57 is stopped to hold the primary and secondary coils 31, 14 in the electromagnetically connectable position (FIG. 11).

Further, since the driver is notified of an improper parking position if the sensors 43 do not operate, he can park the vehicle E again so that the sensors 43 will operate.

Thereafter, the battery 19 is charged in the same manner as in the first embodiment.

Thus, according to this embodiment, the driver only needs to bring the bumper B into contact with the coil positioning apparatus 50 while parking the vehicle E. Thereafter, the coil positioning apparatus 50 positions the coils 31, 14 for the electromagnetic connection. Therefore, the charging can be very easily performed regardless of the driving technique of the driver.

Figure 12:
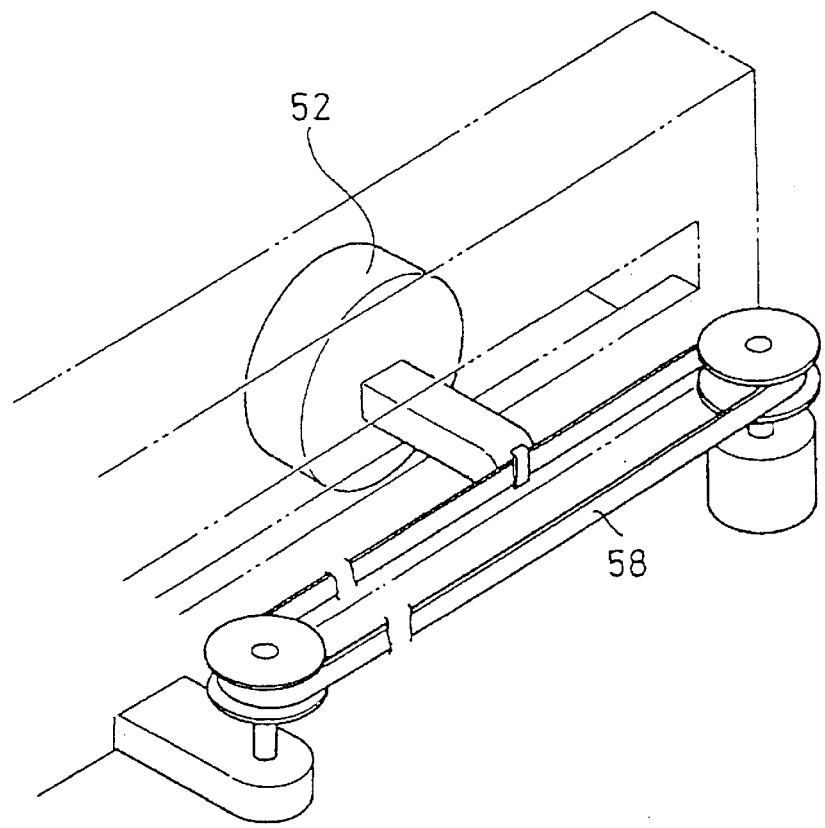
FIG. 12 is a perspective view of another embodiment of a primary coil driving means.
Figure 13:
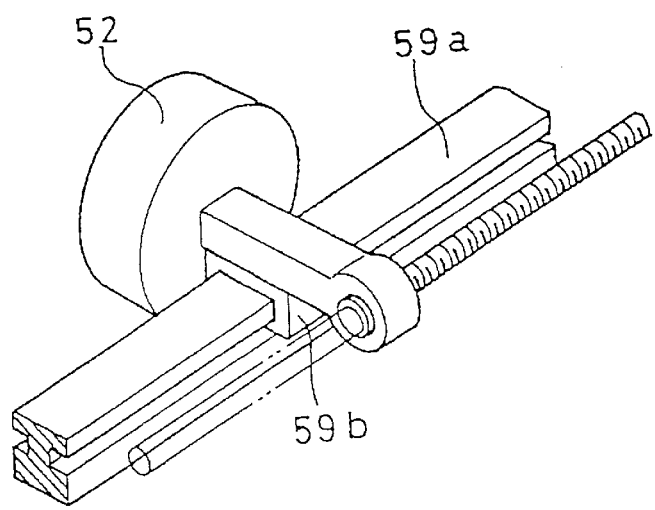
FIG. 13 is a perspective view of still another embodiment of the primary coil driving means.

Although the ball screw mechanism is used as a means for moving the primary coil 31 in this embodiment, the primary coil 31 may, for example, be moved by a timing belt mechanism 58 as shown in FIG. 12. Further, instead of the support rail 51 of this embodiment, a means for supporting the primary coil 31 may be constructed by a rail 59*a* and a slider 59*b* as shown in FIG. 13. Furthermore, as a position detecting means for detecting the position of the secondary coil 14, the sensors 43 are used to detect that the coils 31, 14 are in their electromagnetically connectable positions in this embodiment. However, the position detecting means may, for example, detect a displacement of the coils 31, 14. In such a case, the coils 31, 14 are substantially opposed to each other by moving the primary coil 31 by the detected displacement.

In the fifth embodiment, a coil positioning apparatus 80, which is fixed to the wall surface W in the fourth embodiment, is supported inclinably with respect to the wall surface W in a horizontal plane via elastic support mechanisms 90 so that the coils can be positioned automatically along the lateral direction and automatically can be positioned in substantially opposed parallel to each other. Hereafter, the fifth embodiment is described with reference to FIGS. 14 to 18.

Figure 14:
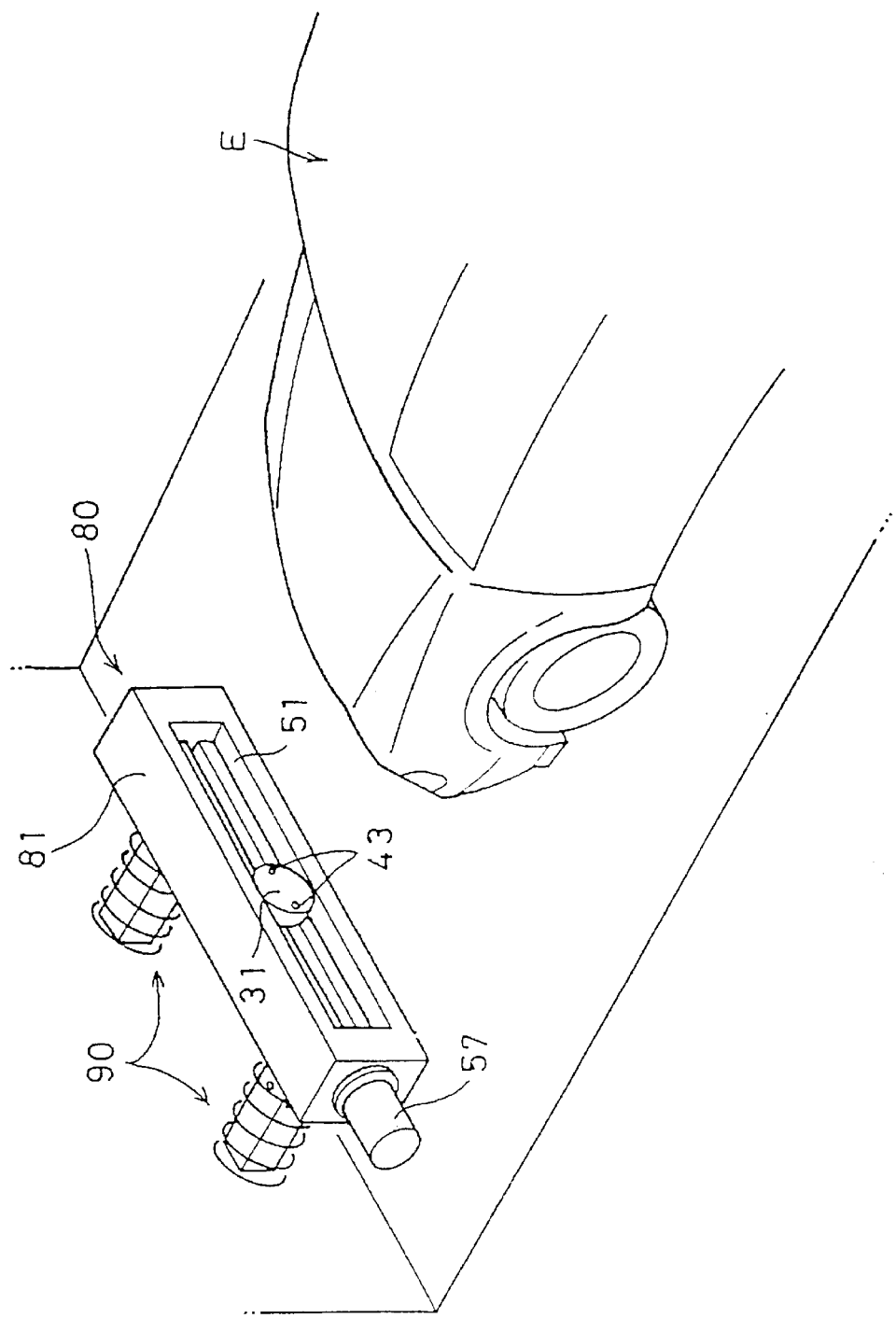
FIG. 14 is a perspective view of a parking space according to a fifth embodiment of the invention.
Figure 15:
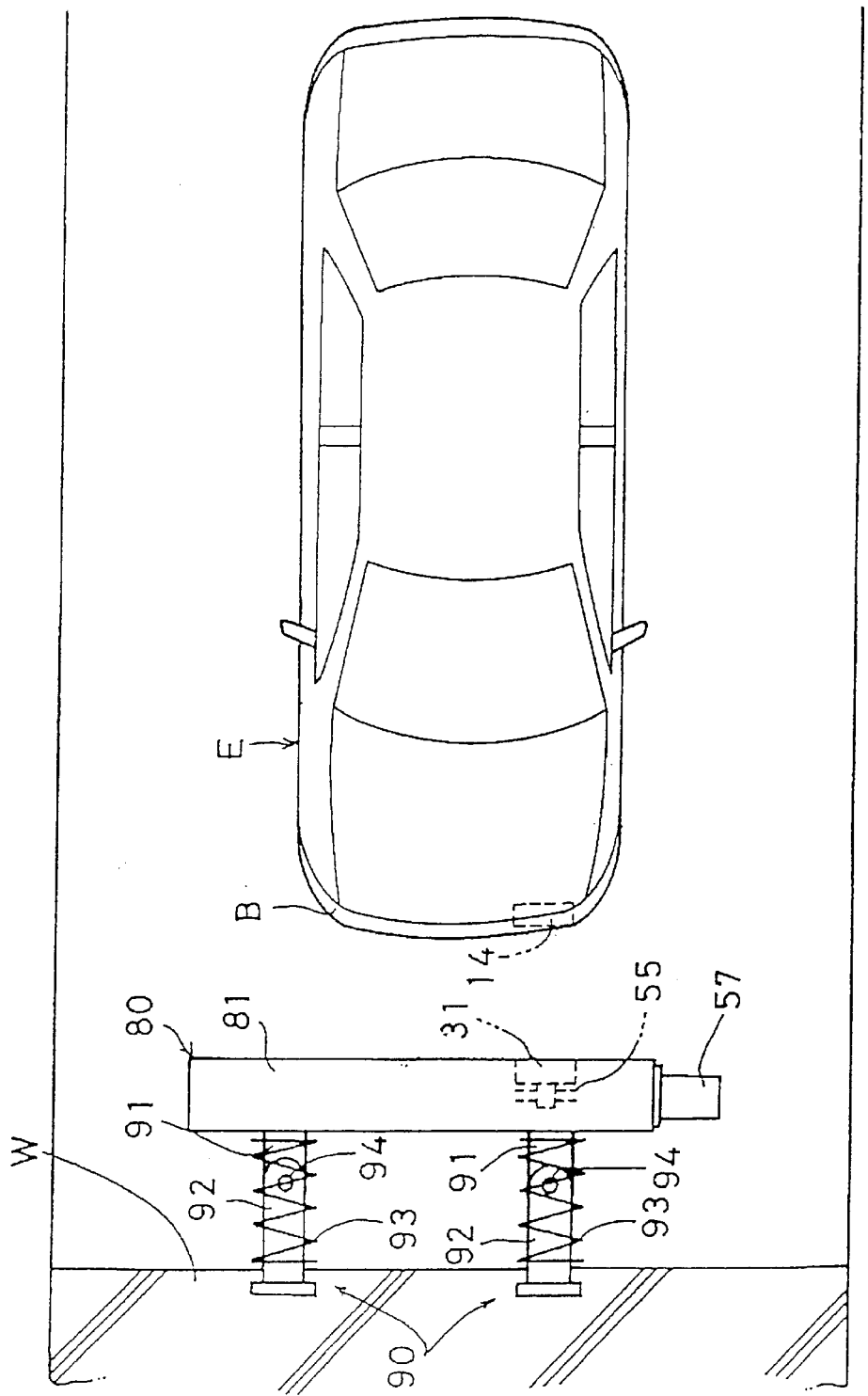
FIG. 15 is a plan view of an electric automotive vehicle parked in the parking space according to the fifth embodiment.
Figure 16:
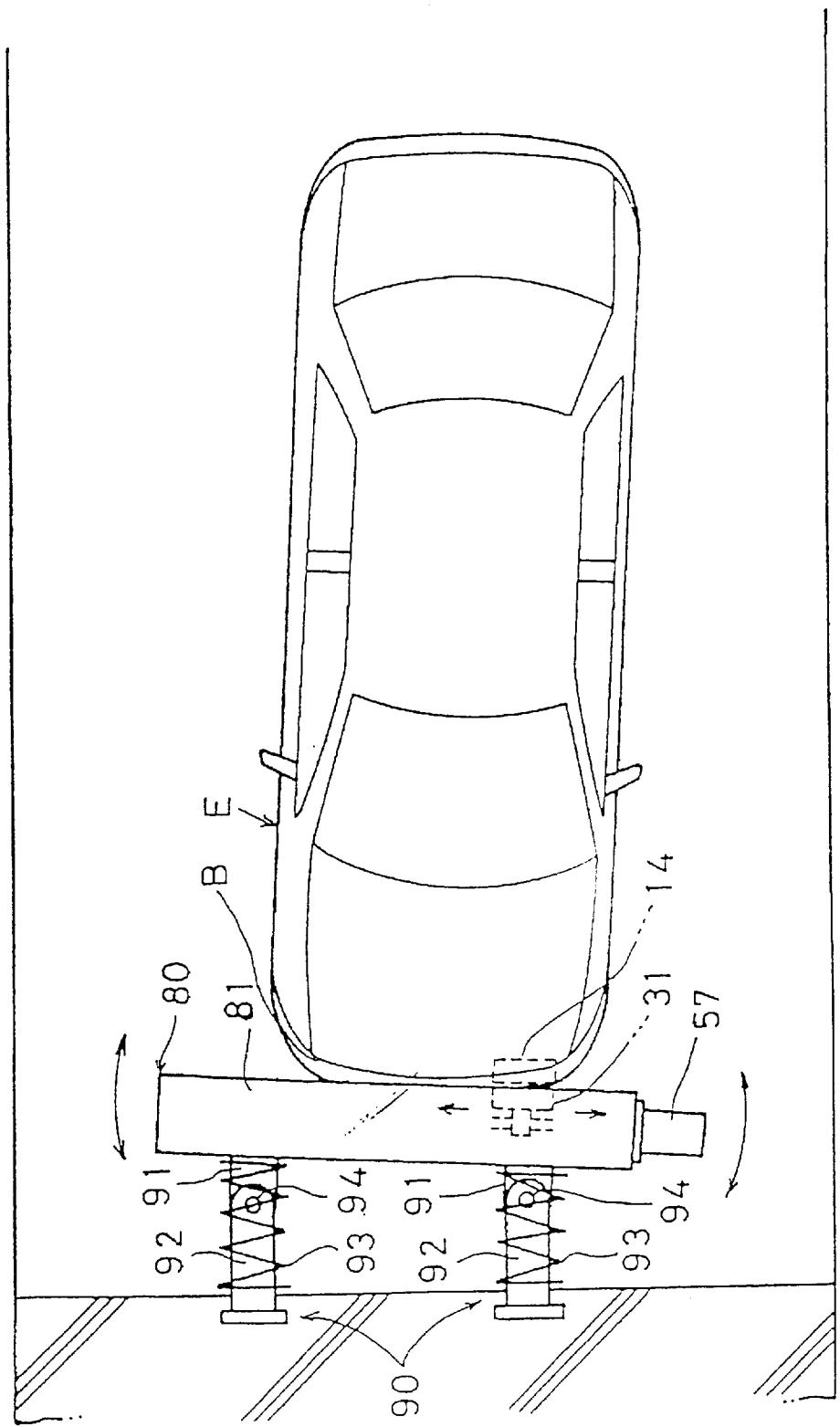
FIG. 16 is a plan view of an electric automotive vehicle obliquely parked in the parking space according to the fifth embodiment.
Figure 17:
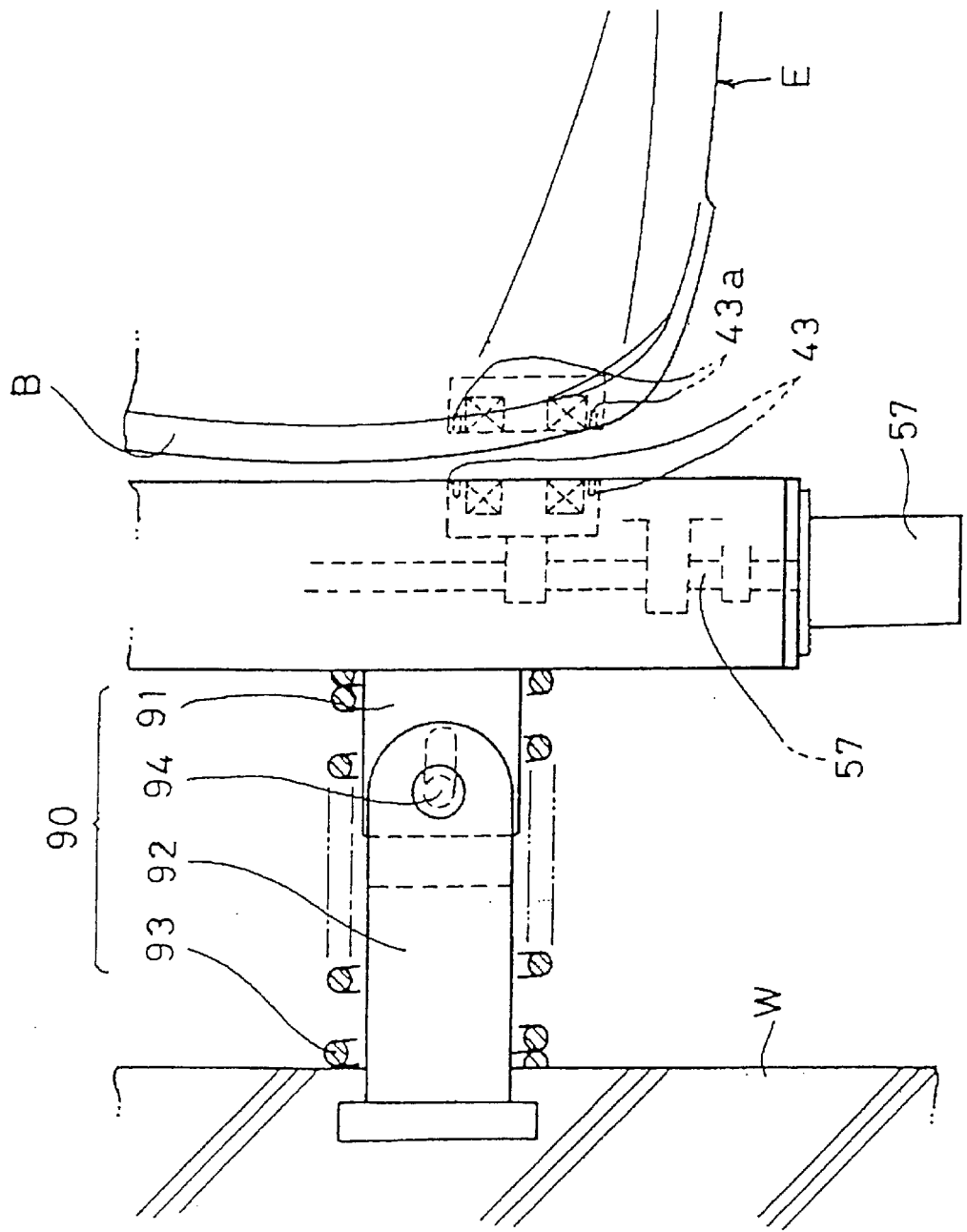
FIG. 17 is a plan view showing an electromagnetically connected state in the fifth embodiment.

The coil positioning apparatus 80 includes a laterally long housing 81 as shown in FIG. 14 or 15. A support rail 51, a ball screw 55 and the like are accommodated in the housing 81 so as to render the same function as the coil positioning apparatus 50 described in the fourth embodiment.

An unillustrated pressure switch 40 is provided in the housing 81 to detect that the support rail 51 provided at the front surface of the housing 81 is pressed. Further, an infrared communication device (not shown) is provided in a specified position of the lower part of the housing 81 to obtain pieces of necessary information such as a charged amount of the vehicle E.

The housing 81 is mounted on the wall surface W of the parking space via the elastic support mechanisms 90 which include each a support bracket 91 extending from the back surface of the housing 81 and a strut 92 projecting from the wall surface W of the parking space. The struts 92 of the mechanisms 90 are placed apart side by side along the horizontal direction by the same distance as the support brackets 91 of the mechanisms 90.

Figure 18:
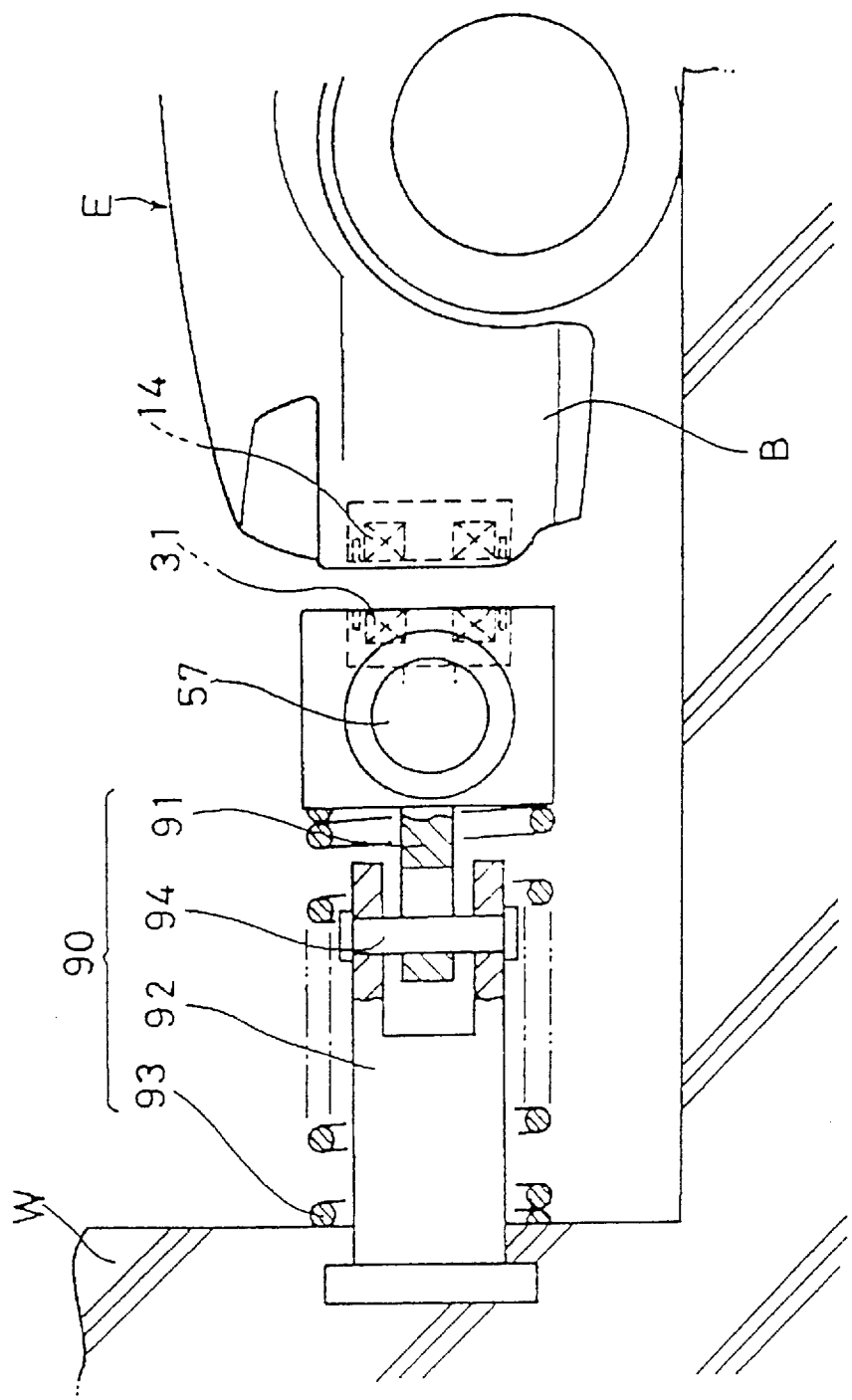
FIG. 18 is a side view showing the electromagnetically connected state in the fifth embodiment.

As shown in FIG. 18, the leading end of each strut 92 is substantially U-shaped and separated into upper and lower parts. A shaft 94 is mounted through these upper and lower parts and the support bracket 91 is disposed between the upper and lower parts. Through holes formed in the strut 92 through which the shaft 94 is inserted have the same diameter as the shaft 94. However through holes formed in support bracket 91 are oblong holes so as to permit the support bracket 91 to move along forward and backward directions with respect to the shaft 94. Accordingly, the support bracket 91 is pivotally and slidably coupled with the leading end of the strut 92 via the shaft 94. The support bracket 91 is also inclinable because the shaft 94 can be inclined in the oblong holes.

As shown in FIG. 18, the opposite ends of the shaft 94 are secured by, e.g. clips, nuts or the like.

The struts 92 and the support brackets 91 coupled as described above are biased in a projecting direction by compression coil springs 93 fitted thereon. Accordingly, the support brackets 91 are securely and stably held in their projected positions, and act as follows. For example, if the vehicle E is obliquely parked, one end of the bumper B comes into contact with one end of the coil positioning apparatus 80. Thus, only the elastic support mechanism 90 at the side pressed by the bumper B slides, and the one at the other side rotates, with the result that the coil positioning apparatus 80 is inclined with respect to the wall surface W along the horizontal plane so that the bumper B of the vehicle E and the coil positioning device 80 are opposed in parallel to each other. Further, if the vehicle E is parked straight, the coil positioning apparatus 80 is equally pressed by the bumper B. Accordingly, both elastic support mechanisms 90 make a sliding movement and the shock is absorbed by the compression coil springs 93. Further, since the elastic support mechanisms 90 are inclinable along the forward and backward directions, they are capable of bringing the coil positioning apparatus 80 and the bumper B into close contact by offsetting the inclinations of the coil positioning apparatus 80 and the bumper B along the forward and backward directions.

On the other hand, the vehicle E is provided with a secondary coil 14 at its front surface. The electromagnetic connection surface of the secondary coil 14 is oriented in conformity with a contact surface of the bumper B with the coil positioning apparatus 80. Accordingly, if the coil positioning apparatus 80 and the bumper B are opposed in parallel to each other as described above, the electromagnetic connection surfaces of the coils 31, 14 are opposed in parallel to each other. Further, since the coil positioning apparatus 80 is inclinable along the forward and backward directions as described above, if the contact surface of the bumper B is inclined, the electromagnetic connection surface of the secondary coil 14 may be accordingly inclined.

Since the other construction is similar to the fourth embodiment, no repetitive description is given thereon by identifying the same elements by the same reference numerals.

Next, how the vehicle E is charged according to the fifth embodiment is described. The vehicle E is advanced in the parking space to bring the bumper B into contact with the coil positioning apparatus 80 projecting from the wall surface W. The vehicle E is stopped when a stop lamp 41 is turned on in response to a pressure switch 40. At this time, even if the vehicle E comes into contact with the coil positioning apparatus 80 along an oblique direction, the elastic support mechanisms 90 act to offset the resulting inclination, thereby allowing the bumper B of the vehicle E to face the coil positioning apparatus 80 substantially straight. Accordingly, the driver needs not consider an angle of the vehicle with respect to the coil positioning apparatus 80. Thus any inclination of the vehicle E with respect to the coil positioning apparatus 80 can be compensated for.

Simultaneously, the coil positioning apparatus 80 starts operating in response to the pressure switch 40, thereby guiding the primary coil 31 to a position where it is electromagnetically connectable with the secondary coil 14 in the same manner as in the fourth embodiment for the charging. At this time, since the bumper B of the vehicle E and the coil positioning apparatus 80 face each other substantially straight, the coils 31, 14 automatically and reliably may be brought to their proper electromagnetically connectable positions. Therefore, the charging can be performed efficiently.

A sixth embodiment of the invention is described with reference to FIGS. 19 to 23.

Figure 19:
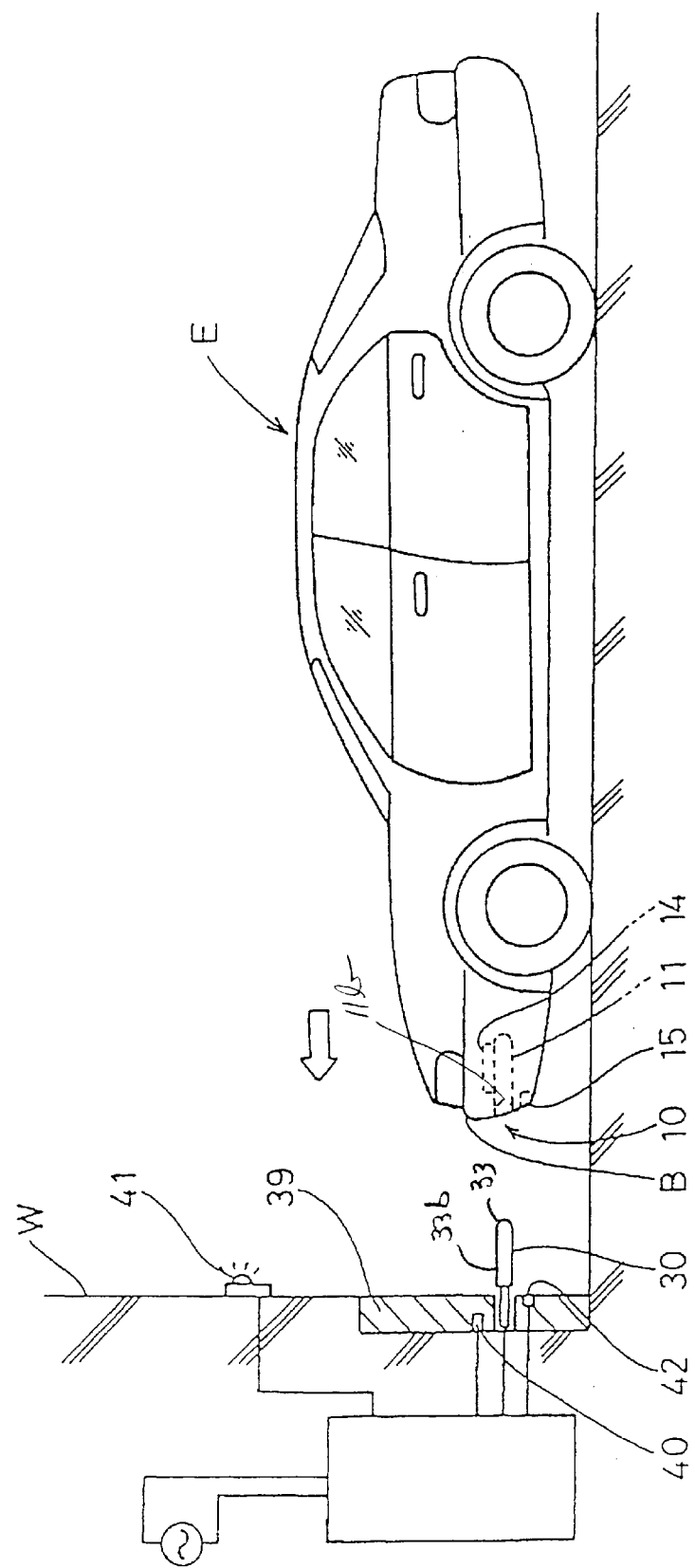
FIG. 19 is an internal construction diagram of a parking space according to a sixth embodiment of the invention.
Figure 20:
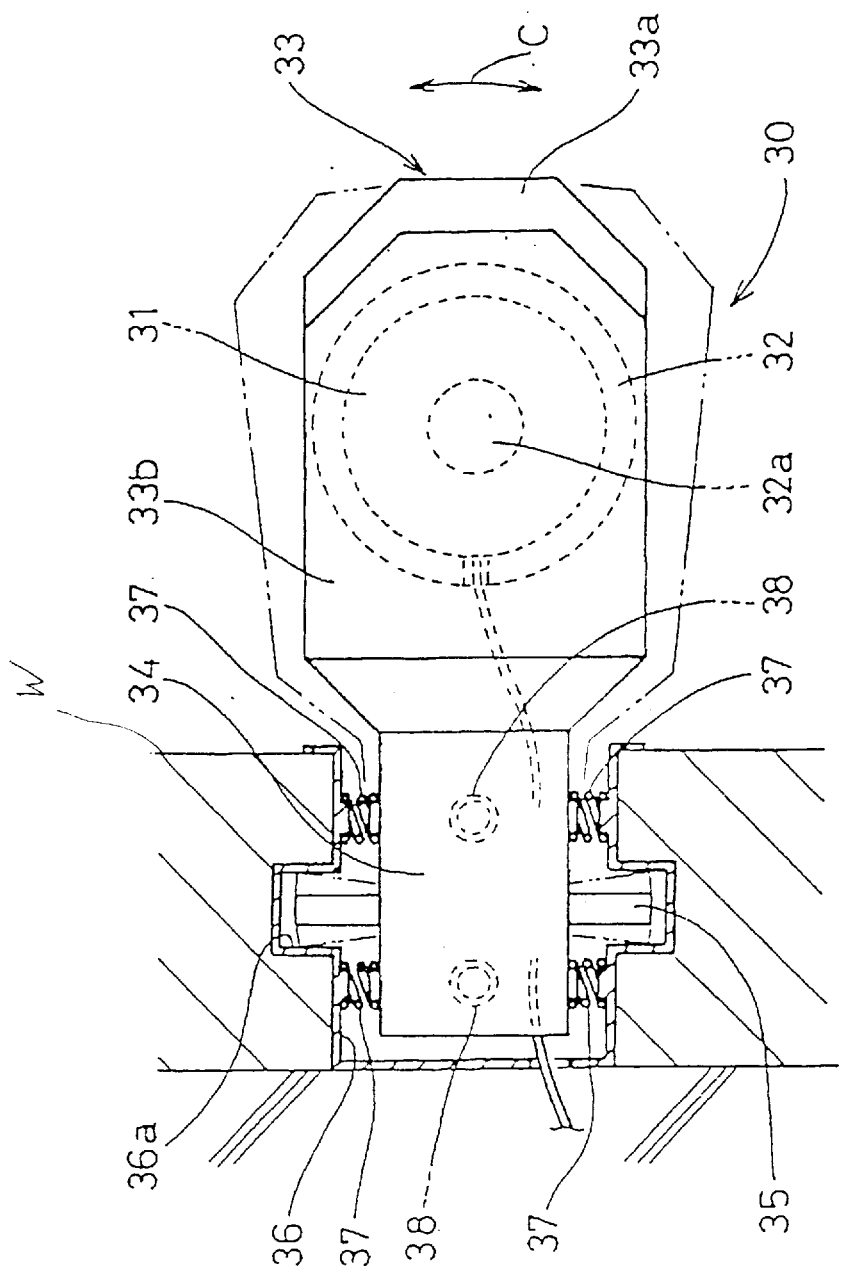
FIG. 20 is a horizontal section of a primary coil unit according to the sixth embodiment.
Figure 21:
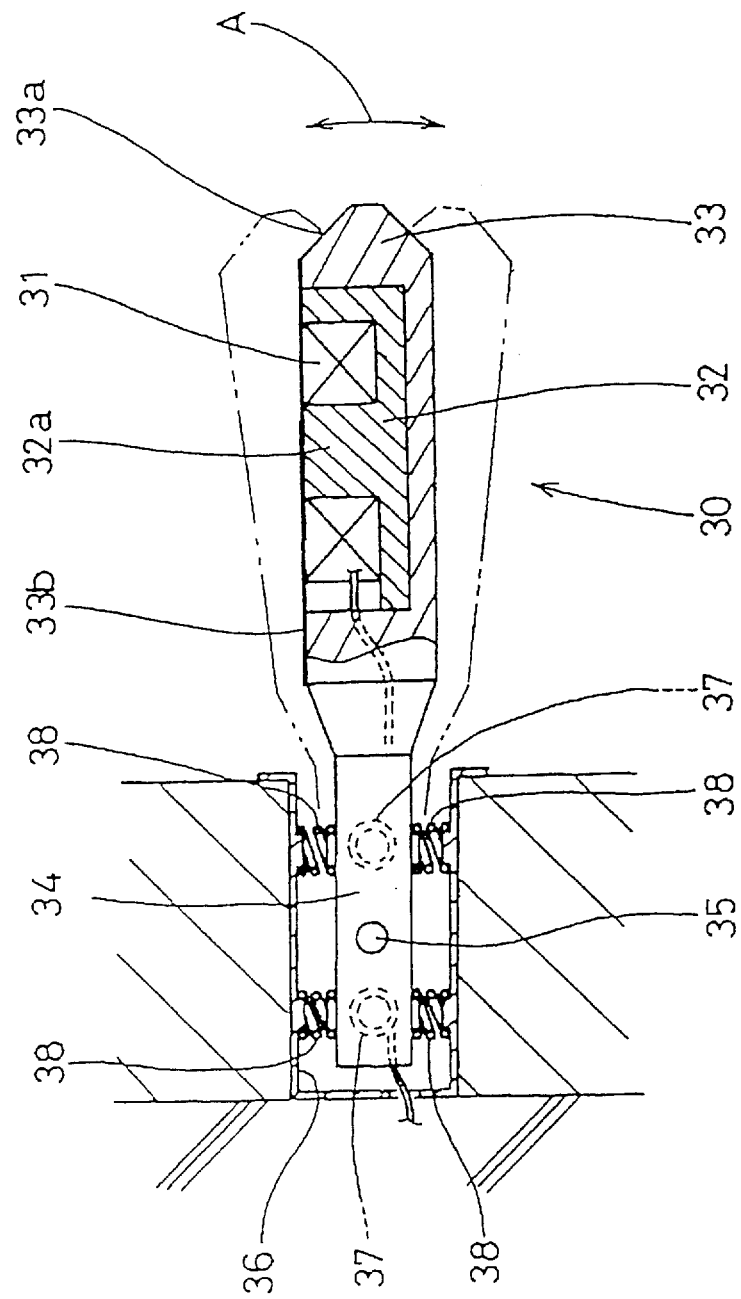
FIG. 21 is a vertical section of the primary coil unit.
Figure 22:
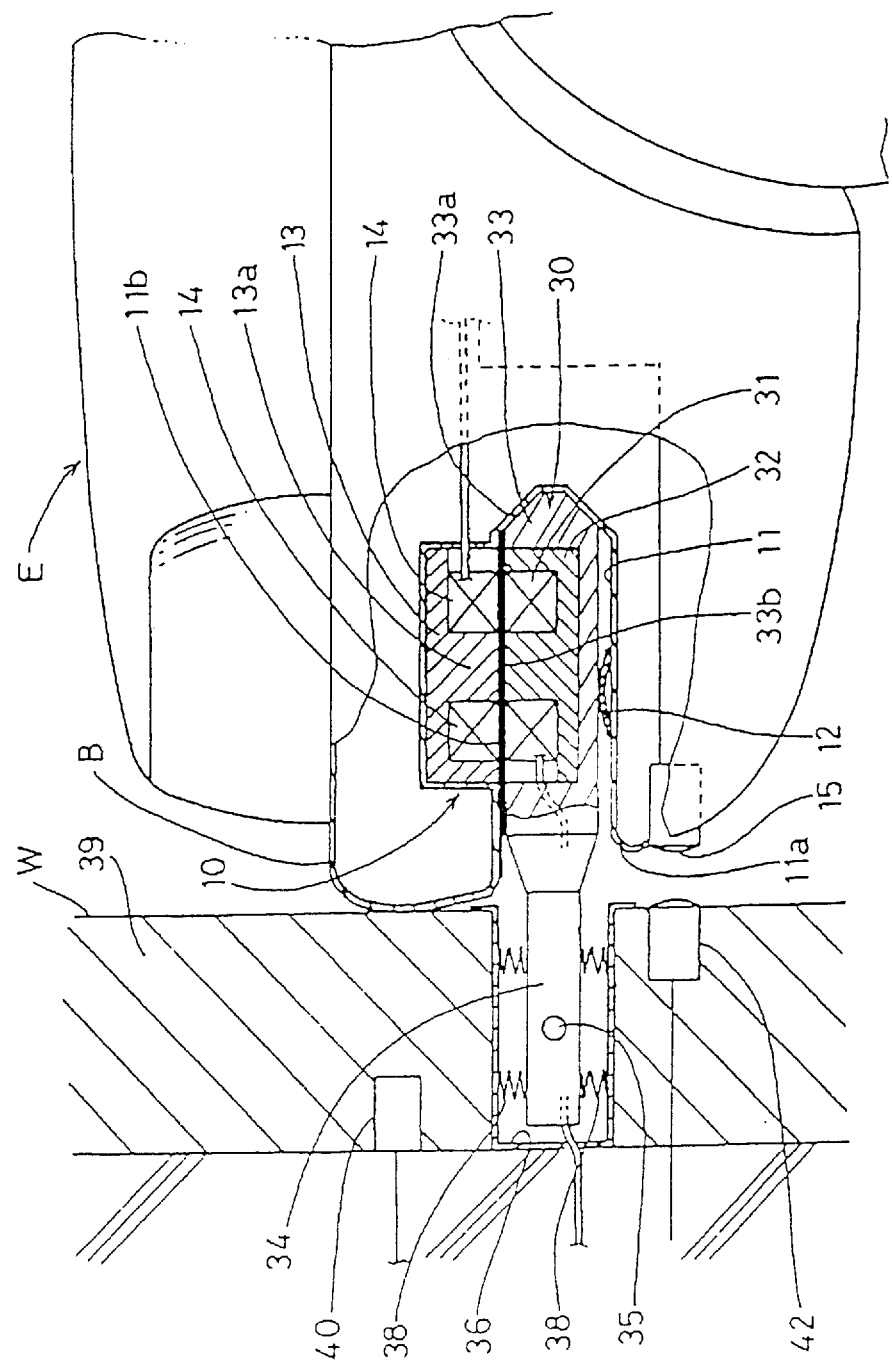
FIG. 22 is a vertical section of the primary and secondary coil units in their connection positions.
Figure 23:
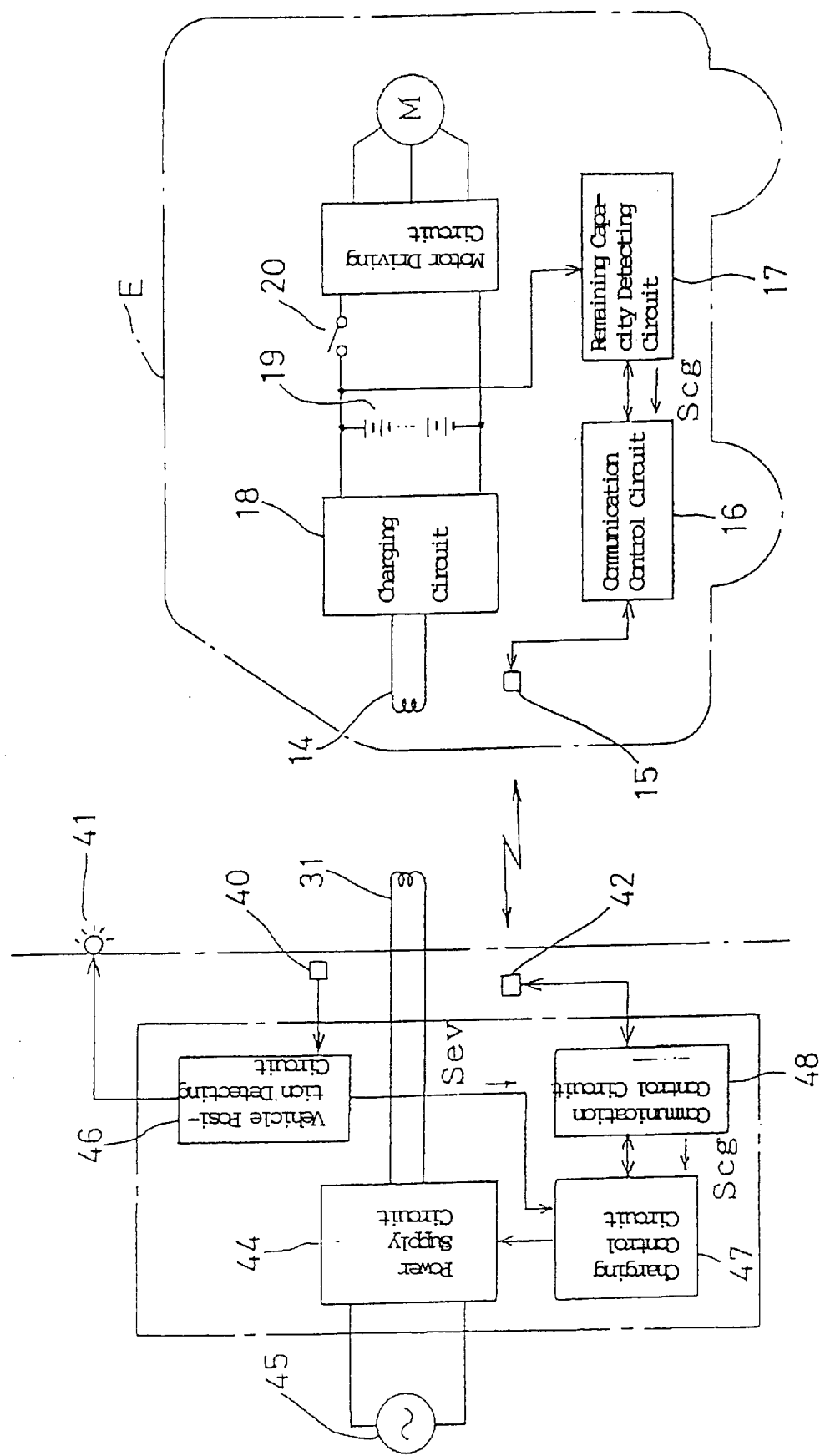
FIG. 23 is a block diagram of a charging system according to the sixth embodiment.

FIG. 19 shows an electric automotive vehicle E being advanced in a parking space. A primary coil unit 30 partly constructing an electromagnetic induction apparatus projects forwardly from a wall surface W of the parking space. The primary coil unit 30 is substantially identical to the primary coil unit 30 described above and illustrated in FIGS. 1–4. However, the open upper surface of the protection casing 33 is covered by a smooth protection film 33b of specified thickness which sealably attaches to the core 32, so that the core 32 and the primary coil 31 are sealed.

The secondary coil unit 10 is provided at a front bottom part of the vehicle E. The secondary coil unit 10 is substantially identical to the secondary coil unit 10 described above and illustrated in FIGS. 1–4. However, the open lower surface of the core 13 is covered by a smooth protection film 11b of specified thickness which sealably attaches to the core 13, so that the core 13 and the secondary coil 14 are sealed. Additionally, at the bottom surface of the receptacle 11, an arch-shaped leaf spring 12 defining to a biasing member is provided. When the primary coil unit 30 is contained in the receptacle 11, the leaf spring 12 biases the protection casing 33 upward to bring the primary and secondary coil units 10, 30 into close contact via the two protection films 11b, 33b. As a result, the coils 31, 14 are electromagnetically connected with the cores 13, 32 coaxially located. The other elements are substantially similar or the same as in the previous embodiments and identical numbers are employed.

The vehicle E is parked substantially as described in the previous embodiments, such that the open surface of the core 32 of the primary coil unit 30 is laterally slid with respect to the open surface of the core 13 of the secondary coil unit 10, and the core 32 of the primary coil unit 30 comes to be coaxially opposed to the core 13 of the secondary coil unit 10 in the receptacle 11. In this state, the primary coil unit 30 is biased toward the secondary coil unit 10 by the leaf spring 12 provided in the receptacle 11, with the result that the coils 14, 31 are brought into close contact via the two thin protection films 11b, 33b, and are connectable electromagnetically with each other. Since the protection films 11b, 33b are both smooth and of specified thickness, the gap between the cores 13, 32 are constantly fixed, ensuring a stable electromagnetically connected state. Charging may proceed as described above using the circuit shown in FIG. 23. However, in this embodiment, the leaf spring 12 is provided at the bottom of the receptacle 11 to bias the primary coil unit 30 toward the secondary coil unit 10, bringing the coil units 10, 30 into close contact. Accordingly, a gap of specified distance is constantly formed between the coil units 10 and 30 via the protection films 11b, 33b. As a result, a stable electromagnetically connected state can advantageously be attained.

Figure 24:
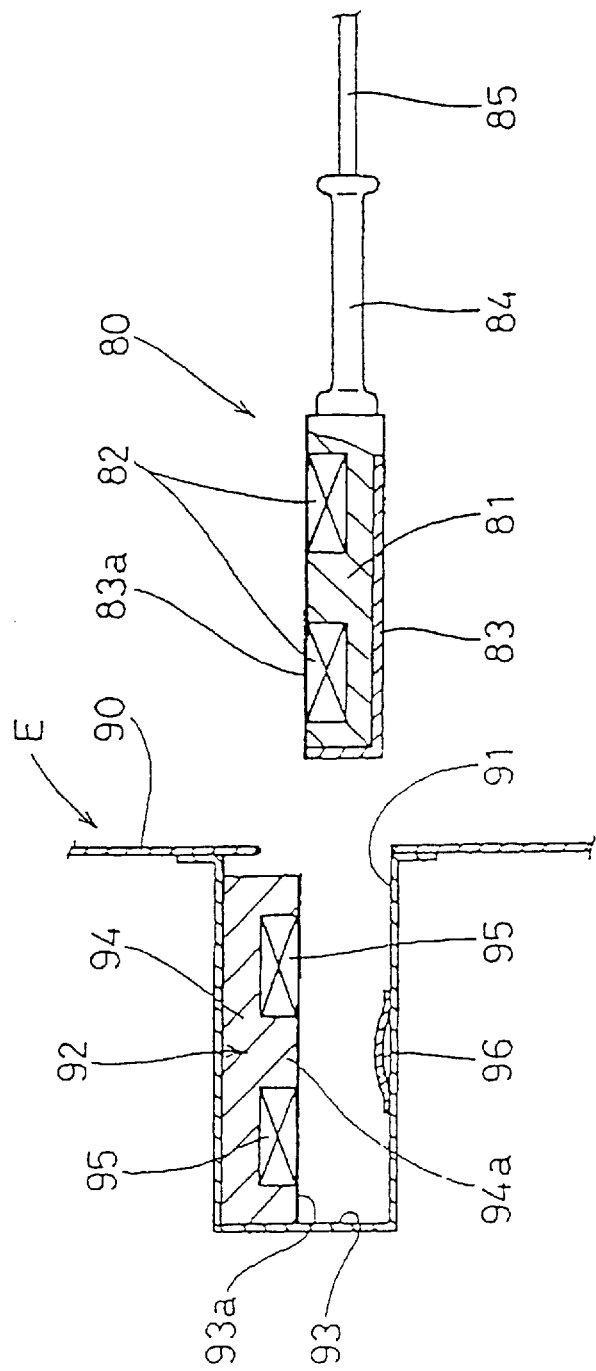
FIG. 24 is a section of a seventh embodiment of the invention.
Figure 25:
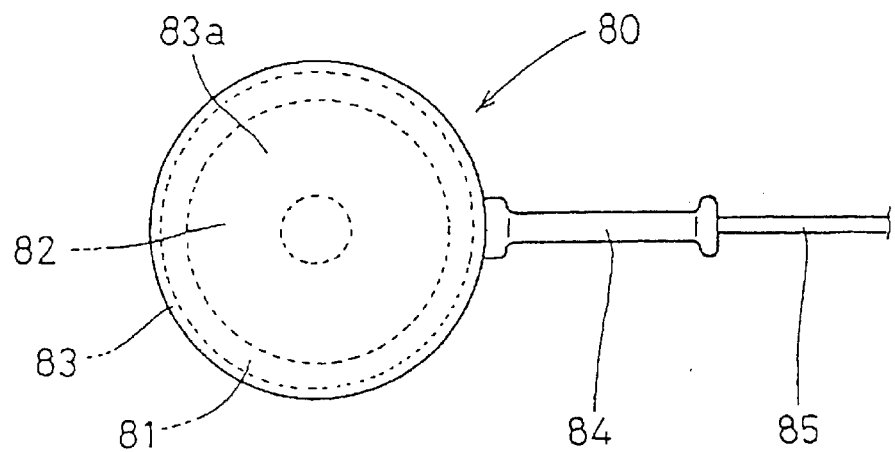
FIG. 25 is a plan view of the primary coil unit according to the seventh embodiment.
Figure 28:
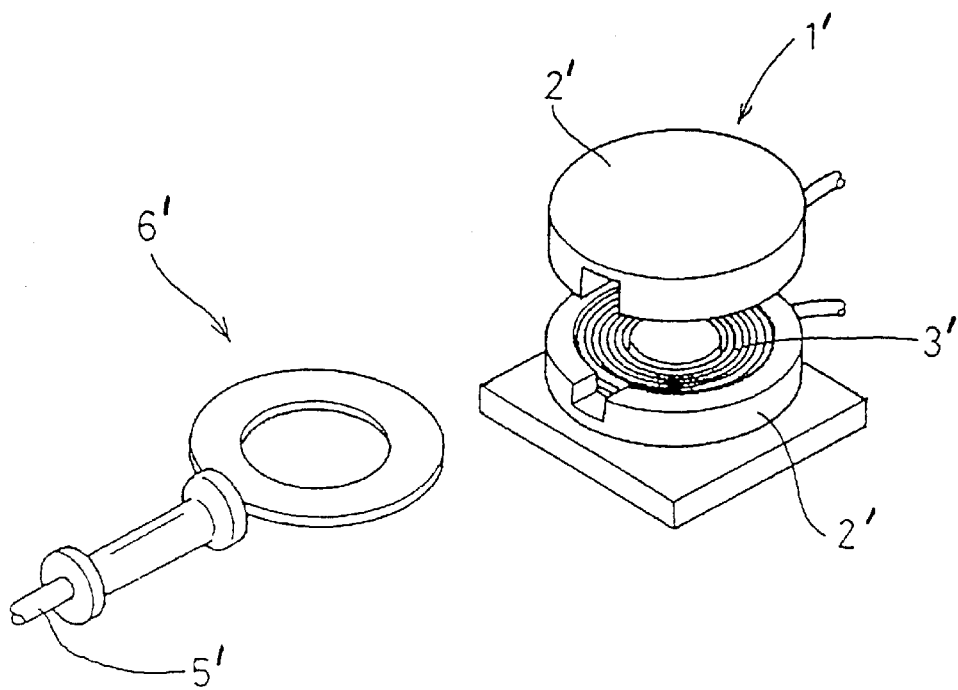
FIG. 28 is a perspective view of a prior art charging system.
Figure 27:
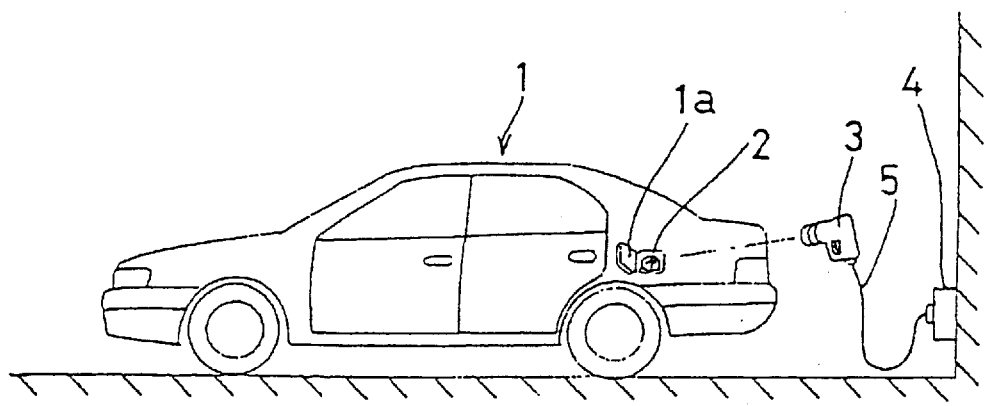
FIG. 27 is a side view of a prior art charging system.

FIGS. 24 and 25 show an exemplary construction with which a primary coil unit is set in an electric automotive vehicle E by hand. Similar to the previous embodiment, a primary coil unit 80 is such that a primary coil 82 is contained in a core 81 having only one surface and the core 81 is accommodated in a protection casing 83. Similar to the previous embodiment, the open surface of the core 81 is covered by a smooth protection film 83a. A handle 84 for gripping the primary coil unit 81 is integrally or unitarily provided at one end of the protection casing 83. A power cable 85 connected with an unillustrated charging power source is drawn through the handle 84.

On the other hand, an opening 91 is formed in a body 90 of the vehicle E, and a secondary coil unit 92 is provided in the opening 91. Similar to the previous embodiment, the secondary coil unit 92 is constructed such that a secondary coil 95 is contained in a core 94 of, e.g. ferrite, and is provided at an upper part of a receptacle 93 for receiving the primary coil unit 80. The core 94 has a shape obtained by inverting the core 81 of the primary coil unit 80, i.e. a substantially flat circular container-like shape having only one open surface (lower surface) and is formed with a circular column 94a in its center. Further, the open lower surface of the core 94 is covered by a smooth protection film 11b of specified thickness. At the bottom surface of the receptacle 93, an arch-shaped leaf spring 96 corresponding to a biasing member is provided. When the primary coil unit 80 is contained in the receptacle 93, the leaf spring 96 biases the primary coil unit 80 upward to bring the primary and secondary coil units 80, 92 into close contact via the two protection films 83a, 93a. As a result, the coils 82, 95 are electromagnetically connected.

In this embodiment, when the vehicle E is to be charged, the primary coil unit 80 is inserted into the receptacle 93 of the secondary coil unit 92 by gripping the handle 84. Then, the open surface of the core 81 of the primary coil unit 80 is laterally slid with respect to the open surface of the core 94 of the secondary coil unit 92, and the core 81 of the primary coil unit 80 comes to be coaxially opposed to the core 94 of the secondary coil unit 92 in the receptacle 93. In this state, the primary coil unit 80 is biased toward the secondary coil unit 92 by the leaf spring 96 provided in the receptacle 92, with the result that the coils 82, 95 are brought into close contact via the two thin protection films 83a, 93a and electromagnetically connectable with each other. Accordingly, similar to the respective foregoing embodiments, the gap between the cores 81 and 94 are constantly fixed, ensuring a stable electromagnetically connected state.

FIG. 26 is a perspective view showing an electric automotive vehicle E being advanced into a parking lot equipped with a wheel guide 160 according to an eighth embodiment of the invention. The wheel guide 160 includes one, two or more projecting, preferably upstanding substantially L-shaped rails, preferably symmetrically arranged on the ground of the parking lot with their longer sides 160a faced in substantially parallel directions. The longer sides 160a are so spaced as to be fittingly located between the left and right wheels of the vehicle E, and have their leading ends bent such that a distance therebetween decreases toward the leading ends. Shorter sides may extend in opposite or outward directions from the longer sides 160a and have such a length that the front wheels of the vehicle E can come into contact therewith. Accordingly, if the vehicle E is advanced into the parking lot with the longer sides 160a located between the left and right wheels, it stops where the front wheels come into contact with the shorter sides. More specifically, the vehicle E is parked while its orientation and position are determined by the wheel guide 160.

The pressure sensors 150 detect that the vehicle E has parked along the wheel guide 160, and their detection results are sent to a main controller provided in an external power source unit.

When the vehicle E is advanced into the parking lot with the longer sides 160a of the wheel guide 160 between the left and right wheels, it is guided with its advancing direction restricted by the longer sides 160a. The vehicle E cannot make any further advance when the front wheels come to positions where they are in contact with the shorter sides or the pressure sensors 150, with the result that a driver can know that the vehicle E is in the charging position. When the pressure sensors 150 are pressed by the front wheels, a lamp provided at the external power source unit may be turned on. The driver can also know from this lamp that the vehicle E is in the charging position. When the vehicle E is stopped in the charging position, the secondary coil 10 is opposed to the primary coil 30.

As described above, once that the vehicle E is brought to the wheel guide, the vehicle easily can be parked in the charging position regardless of the parking technique of the driver.

Although the wheel guide and the primary coil are separately formed and are so arranged as to have a specified positional relationship, the primary coil and the wheel guide may be formed as a single unit and may be arranged in the parking lot. Further, although the left and right wheels of the vehicle E are guided, the vehicle E may be guided by restricting the opposite side surface of the wheel of the vehicle E at one side by a narrow substantially U-shaped wheel guide 161 as shown in FIG. 26.

When the wheels of the vehicle E reach the pressure switch(es) 150 the primary coil unit 10 is substantially coupled or connected with the secondary coil unit 30 provided in the vehicle E.

The present invention is not limited to the foregoing described and illustrated embodiments. For example, the following embodiments are also embraced by the technical scope of the present invention as defined in the claims. Besides these embodiments, a variety of changes may be made without departing from the spirit and scope of the present invention as defined in the claims.

Although the primary coil unit 30 is provided in the wall surface W of the parking space in the first to fourth embodiments, the present invention is not limited to such a primary coil unit 30. For example, the primary coil may project from the ground of the parking space toward the secondary coil provided at the bottom of the electric automotive vehicle for the electromagnetic connection. Alternatively, the primary coil may be provided at the ceiling, bonnet or trunk lid of the vehicle, and the secondary coil may be hung from the ceiling of the parking space and be lowered for the connection with the primary coil. Even in the case that the primary coil is provided in the wall surface of the parking space, it is not limited to the one which is fixed to project from the wall surface W as in the foregoing embodiments. The primary coil may project from the wall surface when the vehicle is parked in the predetermined position for the connection with the secondary coil provided in the vehicle. Alternatively, the primary coil may be rotatably mounted at the wall surface about a horizontally extending rotatable shaft. Upon detecting that the vehicle has parked in the predetermined position, the primary coil may be rotated upward from a lower position to a position where it is connected with the secondary coil provided at the front bottom surface of the vehicle.

In the foregoing embodiments, the remaining capacity detecting means is provided to automatically charge the battery 19 in the case that the battery 19 has a small remaining capacity. However, the present invention is not limited to such a charging system. For example, instead of the remaining capacity detecting means, a charging switch may be provided in an instrument panel in a passenger compartment. Charging may be started when the driver operates this charging switch after parking the vehicle in the predetermined position.

The vehicle position detecting means is not limited to the pressure switch embedded in the shock absorbing material 39 as in the foregoing embodiments, but it may be embodied in various other ways as follows. A deformation gauge may be mounted on the surface of the shock absorbing material to detect the deformation of the shock absorbing material caused by the contact of the vehicle. The shock absorbing material may be made of conductive rubber, and the compression of the conductive rubber caused by the contact of the vehicle may be detected by measuring a conductivity of the conductive rubber. A proximity switch using an infrared or ultrasonic wave, magnetic field, light or the like may be provided at the wall surface of the parking space to detect an approach of the vehicle. A photoelectric switch of light blocking type including a plurality of pairs of light emitters and light receptors may be provided in a predetermined position of the parking space. When the vehicle is parked in the predetermined position, it blocks the light paths between the light emitters and the light receptors, with the result that the photoelectric switch detects that the vehicle is parked in the predetermined position. An ultrasonic wave transmitter or a light emitter may be provided in a specified position of the vehicle, and a corresponding detector may be provided in, e.g. the wall surface of the parking space. An alternating current used for the detection may be caused to flow in the primary coil, and a phase difference of a voltage/current may be measured. The vehicle may be detected based on a change in the phase difference of the voltage/current when the vehicle is parked in the predetermined position and the primary and secondary coils are electromagnetically connected.

Although the communication is conducted between the vehicle and the parking space via the infrared communication devices 15, 42 in the foregoing embodiments, the present invention is not limited to this. The communication may be conducted using a radio wave, an ultrasonic wave, a visible light or the like.

A vehicle guide for fittably guiding wheels of the vehicle may be provided on the ground of the parking space in order to park the vehicle in the predetermined position of the parking space.

Although the support base 34 of the primary coil unit 30 is supported by the compression springs 38 in the foregoing embodiments, it may be supported by another elastic member such as rubbers or leaf springs.

Besides the elastic support mechanisms 90 shown in the fifth embodiment, the support mechanism for supporting the primary coil on the wall surface of the parking space may be constructed in other ways. For example, a coil positioning apparatus provided with the primary coil may be inclinably supported in one widthwise middle position with respect to the wall surface W of the parking space, i.e. has a seesaw construction, and is biased by a coil spring or the like so as to be balanced. With this arrangement as well, in the case that the vehicle is advanced toward the wall surface in an oblique direction different from a direction perpendicular to the wall surface, the primary coil may be inclined by the front part of the vehicle having come into contact with the coil positioning apparatus to be opposed in parallel to the secondary coil. In this case, the support mechanism can be constructed advantageously and easily. In the fifth embodiment, the coil positioning apparatus 80 may be inclined by a difference in the lengths of the struts 92 as the support portions which results from the extension and compression thereof, while offsetting the movement of the vehicle E along the forward and backward directions. Therefore, the coil positioning apparatus can adjust itself more easily to the angle of the parked vehicle E.

As another alternate to the elastic support mechanism 90 of the fifth embodiment, a slider or parallel link may be provided at the struts 92 of the fifth embodiment or at the inclination support portions of the above seesaw construction so as to movably support the primary coil upwardly and downwardly in parallel with the wall surface W of the parking space. Alternatively, the base ends of the struts 92 may be rotatably supported by horizontally extending support shafts so that the leading ends of the struts 92 are inclinable upward and downward. For example, since the degree of compression of a suspension spring provided in the vehicle body differs depending upon carrying loads of the vehicle, the position of the secondary coil mounted on the vehicle body slightly differs depending on the carrying loads. With the above constructions, even under such a condition, the variation of the position of the secondary coil is offset by moving the primary coil upwardly or downwardly. Therefore, the primary and secondary coils constantly are opposed to each other in a satisfactory manner.

The primary coil also may be supported by an elastic strut. For example, the primary coil may be held at the leading end of a coil spring or a rubber strut projecting from the wall surface so as to be freely movable upward, downward, to the left and to the right. In this case, the inclination mechanism can be realized easily and inexpensively.

Although the motor is driven to move the primary coil along the lateral direction (horizontal direction) in the fourth embodiment, the primary coil may be supported on a substantially horizontally extending support rail, freely movably along a horizontal direction. When the primary coil is excited during the charging, a force may act between the coils to coincide the magnetic centers thereof due to a magnetic flux linking the primary coil with the secondary coil. With the above construction, the primary coil moves in a direction to coincide the magnetic centers of the primary and secondary coils by such a force, thereby enhancing the degree of electromagnetic connection.

The primary coil also may be fixed to the support mechanism. In such a case, the vehicle can be guided such that the coils are brought into their proper electromagnetically connectable positions by providing a mechanism for guiding the wheels of the vehicle on the ground of the parking space. Accordingly, the electromagnetic connection apparatus for the electric automotive vehicle can compactly and inexpensively be realized.

The primary coil unit may not necessarily constantly project from the wall surface, but may be retracted into the wall surface. The front or rear part of the vehicle may be inserted into such a primary coil unit. Further, the primary coil unit may be provided with a dust protective cover or a protection cover. Upon detecting a contact or approach of the bumper of the vehicle, this cover is opened to permit the connection with the secondary coil unit.

What is claimed is:

1. A connection system for charging a battery (19) of an electric automotive vehicle (E), comprising: a primary coil unit (30) connectable with an external power source (44), the primary coil unit (30) comprising a primary coil (31) accommodated in a protection casing (33) and having a support base (34) projecting therefrom, the support base (34) being movably supported in a holder (36) provided at a wall surface (W) of a parking space, such that at least the primary coil (31) and the protection casing (33) project from the wall surface (W) at an angle different from 0° and 180°, at least one elastic member (37; 38) being disposed between the support base (34) and the holder (36) for achieving a selected alignment therebetween; and a secondary coil unit (10) connectable with the battery (19) provided in the vehicle (E), the secondary coil unit (10) being disposed in a receptacle (11) on a surface of the vehicle (E) that is positioned for approaching the wall surface (W) of the parking space as the vehicle (E) is parked, the primary coil unit (30) being electromagnetically coupleable with the secondary coil unit (10) for inducing a current in the secondary coil unit (10).

2. A connection system according to claim 1, wherein the support base (34) includes a support shaft, the holder (36) having bearing holes (36a) for bearing the support shaft (35) the bearing holes (36a) being substantially larger than the support shaft (35), the leading end of the protection casing (33) being displaceable by loosely fitting the support shaft (35) in the bearing holes (36a).

3. A connection system according to claim 1, wherein a slanted surface (33a) is formed at a leading end of the primary coil unit (30) so as to taper the primary coil unit (30) in a coupling direction.

4. A connection system according to claim 1, wherein a guide slanted surface (11a) is formed at a front opening edge of the receptacle (11) into which the primary coil unit (30) is insertable so as to make the opening area larger along a direction of insertion.

5. A connection system according to claim 1, wherein the primary and secondary coil units (30; 10) each are constructed by winding a coil (31; 14) around a core (32; 13) having only one magnetically open surface configured to be opposed to the magnetically open surface of the opposite core (13; 32), the primary and secondary coil units (30; 10) being so disposed that the open surfaces of the respective cores (32; 13) are slidably positionable to be opposed to each other.

6. A connection system according to claim 1, further comprising a biasing member (12) provided in connection with the secondary coil unit (10) for biasing the primary coil unit (30) and the secondary coil unit (10) so as to attain a specified substantially opposed state.

7. A connection system according to claim 1, wherein there are further provided: a vehicle position detecting means (40; 43; 43a) for detecting that the primary and secondary coil units (30; 10) are in their electromagnetically connectable positions, and a charging control circuit (47) for exciting the primary coil unit (30) by means of the power source (44) on condition that the vehicle position detecting means (40; 43; 43a) detects that the vehicle (E) is in a predetermined position.

8. A connection system according to claim 7, wherein the charging control circuit (47) for controlling the exciting of the primary coil unit (30) comprises a remaining capacity detecting means (63) for detecting a remaining capacity of the battery (19), and for exciting the primary coil unit (30) on condition that the remaining capacity detected by the remaining capacity detecting means (63) is equal to or smaller than a predetermined value.

9. A connection system according to claim 8, further comprising a display means (62) for displaying a charged state corresponding to the remaining capacity of the battery (19).

10. A connection system according to claim 7, further comprising an identification code transmitting means (70) provided in connection with the secondary coil unit (10) for transmitting an identification code of the vehicle, and an identification code checking means (71) provided in connection with the primary coil unit (30) for comparing an identification code received from the identification code transmitting means (70) with a pre-stored identification code, wherein the charging control circuit (47) excites the primary coil unit (30) on condition that the identification codes compared by the identification code checking means (71) agree.

11. A connection system for charging a battery (19) of an electric automotive vehicle (E), comprising: a primary coil unit (30) connectable with an external power source (44) and a secondary coil unit (10) connectable with a battery (19) provided in the vehicle (E), the primary coil unit (30) comprising:

a housing (81);

a primary coil (31) movably mounted in the housing;

movable support mechanisms (90) for movably supporting the housing (81) relative to a wall surface (W) of a parking space, the support mechanisms (90) comprising elastic members (93) for urging the housing (81) into a specified orientation spaced from the wall surface (W) of the parking space, whereby the primary coil (31) is movable in the housing (81) to substantially align with a relative location of the secondary coil unit (10) on the vehicle (E), and whereby the elastic members (93) enable resiliently adjustable alignment of the housing (81) relative to the wall surface (W) for accommodating misalignment of the vehicle (E) in the parking space.

12. A connection system according to claim 11, further comprising a coil positioning apparatus (57) for selectively moving the primary coil (31) in the housing (81) for achieving substantial alignment between the primary coil (31) and the secondary coil (10).

13. A connection system according to claim 12, further comprising a vehicle position detecting means (43; 43a) for detecting that the primary coil (31) and the secondary coil unit (10) are in an electromagnetically connectable position relative to one another.

* * * * *